US010996877B2

(12) United States Patent
Sasamoto et al.

(10) Patent No.: US 10,996,877 B2
(45) Date of Patent: May 4, 2021

(54) SEMICONDUCTOR DEVICE AND MEMORY ACCESS SETUP METHOD

(71) Applicant: RENESAS ELECTRONICS CORPORATION, Tokyo (JP)

(72) Inventors: Manabu Sasamoto, Tokyo (JP); Atsushi Nakamura, Tokyo (JP); Hanno Lieske, Tokyo (JP); Shigeru Matsuo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 26 days.

(21) Appl. No.: 16/405,542

(22) Filed: May 7, 2019

(65) Prior Publication Data
US 2019/0361620 A1  Nov. 28, 2019

(30) Foreign Application Priority Data
May 28, 2018 (JP) .............................. JP2018-101344

(51) Int. Cl.
*G06F 3/06* (2006.01)
*G06F 13/16* (2006.01)
(Continued)

(52) U.S. Cl.
CPC .......... *G06F 3/0634* (2013.01); *G06F 3/0613* (2013.01); *G06F 3/0659* (2013.01);
(Continued)

(58) Field of Classification Search
CPC .... G06F 3/0634; G06F 3/0613; G06F 3/0659; G06F 3/0679; G06F 13/1668;
(Continued)

(56) References Cited

U.S. PATENT DOCUMENTS

2004/0221071 A1* 11/2004 Baker ................... G06F 13/124
710/20
2013/0232304 A1* 9/2013 Lohman .............. G06F 12/0607
711/127
2018/0101763 A1 4/2018 Barnard et al.

FOREIGN PATENT DOCUMENTS

JP  2017-126203 A  7/2017

OTHER PUBLICATIONS

Du et al., ShiDianNao: Shifting Vision Processing Closer to the Sensor, Jan. 2015, Proceedings of the 42nd Annual International Symposium on Comuter Architecture, pp. 92-104 (Year: 2015).*

(Continued)

*Primary Examiner* — Said M Elnoubi
(74) *Attorney, Agent, or Firm* — McDermott Will & Emery LLP

(57) ABSTRACT

Limitations on memory access decrease the computing capability of related-art semiconductor devices during convolution processing in a convolutional neural network. A semiconductor device according to an aspect of the present invention includes an accelerator section that performs computation on a plurality of intermediate layers included in a convolutional neural network by using a memory having a plurality of banks capable of changing the read/write status on an individual bank basis. The accelerator section includes a network layer control section that controls a memory control section in such a manner as to change the read/write status assigned to the banks storing input data or output data of the intermediate layers in accordance with the transfer amounts and transfer rates of the input data and output data of the intermediate layers included in the convolutional neural network.

12 Claims, 21 Drawing Sheets

(51) Int. Cl.
*G06K 9/00* (2006.01)
*G06K 9/62* (2006.01)
*G06N 3/04* (2006.01)

(52) U.S. Cl.
CPC ........ *G06F 3/0679* (2013.01); *G06F 13/1668* (2013.01); *G06K 9/00979* (2013.01); *G06K 9/623* (2013.01); *G06K 9/6232* (2013.01); *G06N 3/04* (2013.01)

(58) Field of Classification Search
CPC ....... G06F 2212/1016; G06F 2212/301; G06F 2212/6012; G06F 12/0844; G06F 12/0284; G06K 9/00979; G06K 9/623; G06K 9/6232; G06N 3/04; G06N 3/0481; G06N 3/0454; G06N 3/063
See application file for complete search history.

(56) References Cited

OTHER PUBLICATIONS

Extended European Search Report issued in corresponding European Patent Application No. 19175054.6-1221, dated Oct. 25, 2019.
Ziong Du et al., "ShiDianNao", Proceedings of the 42nd Annual International Symposium on Computer Architecture, ISCA '15, Jan. 1, 2015 (Jan. 1, 2015), pp. 92-104.
He Yifan et al., "A configurable SIMD architecture with explicit datapath for intelligent learning", 2016 International Conference on Embedded Computer Systems: Architectures, Modeling and Simulation (SAMOS), IEEE, Jul. 17, 2016 (Jul. 17, 2016), pp. 156-163.
Srimat Chakradhar et al., "A dynamically configurable coprocessor for convolutional neural networks", Proceedings of the 37th Annual International Symposium on Computer Architecture, ISCA'10, Jan. 1, 2010 (Jan. 1, 2010), p. 247.
European Office Action issued in corresponding European Patent Application No. 19175054.6-1203, dated Dec. 14, 2020.

* cited by examiner

FIG. 3

FIG. 7
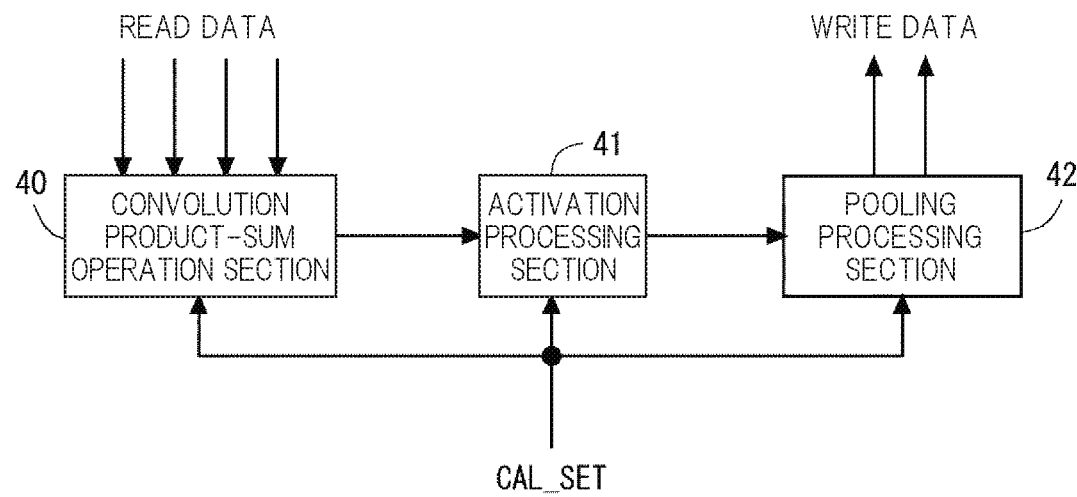
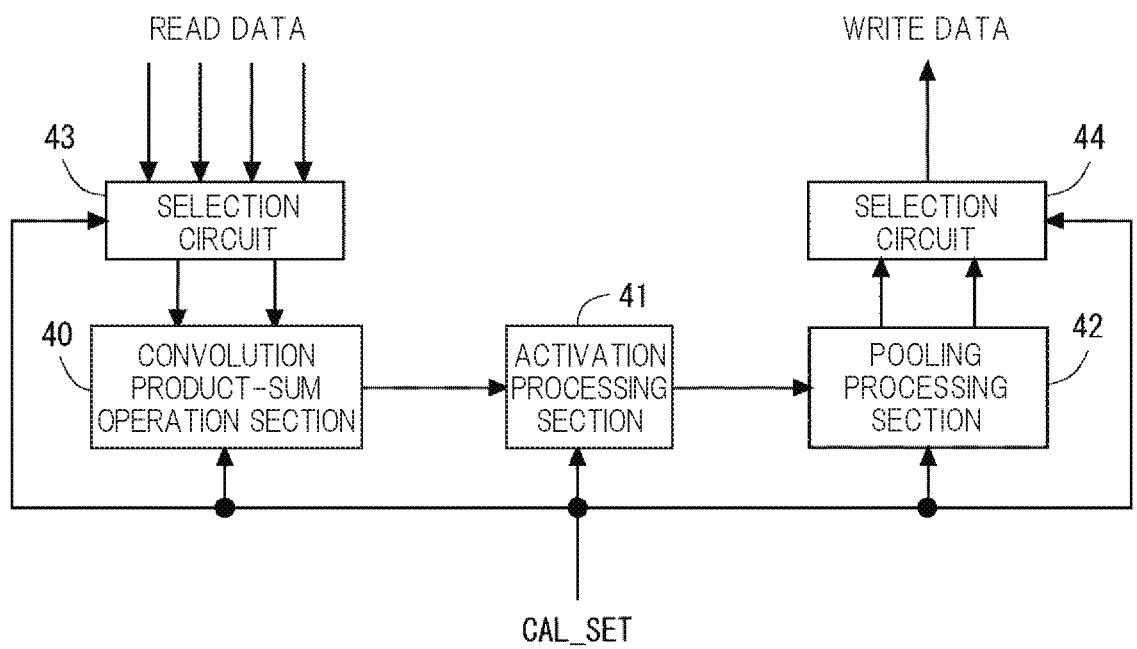

US 10,996,877 B2

SEMICONDUCTOR DEVICE AND MEMORY ACCESS SETUP METHOD

CROSS-REFERENCE TO RELATED APPLICATIONS

The disclosure of Japanese Patent Application No. 2018-101344 filed on May 28, 2018 including the specification, drawings and abstract is incorporated herein by reference in its entirety.

BACKGROUND

The present invention relates to a semiconductor device and to a memory access setup method. For example, the present invention relates to a semiconductor device for performing a process concerning a convolutional neural network, and also relates to a memory access setup method.

In recent years, many recognition processes based on a neural network are proposed in the field of image recognition. One of the neural networks used in the field of such image processing is a convolutional neural network (CNN). An example of a technology concerning the convolutional neural network is disclosed in Japanese Unexamined Patent Application Publication No. 2017-126203.

An arithmetic processing unit described in Japanese Unexamined Patent Application Publication No. 2017-126203 includes a computing section, an external memory, and a buffer, and performs computation with a plurality of hierarchically coupled processing layers. When writing data out, the buffer retains part of the data in a data retention area, and writes the remaining data not retained in the data retention area out to the external memory through a ring buffer area by a first-in, first-out method. Further, when reading data out, the buffer reads data retained in the data retention area out to the computing section, and reads the remaining data not retained in the data retention area out to the computing section through the ring buffer area by the first-in, first-out method.

SUMMARY

The convolutional neural network is characterized in that the transfer amount and transfer rate of input/output data significantly varies from one processing layer to another. However, the arithmetic processing unit described in Japanese Unexamined Patent Application Publication No. 2017-126203 has a fixed buffer capacity. Therefore, if the external memory is accessed due to an insufficient buffer capacity or an insufficient data transfer rate in a case where a required data transfer amount or a required data transfer rate increases or decreases in the arithmetic processing unit described in Japanese Unexamined Patent Application Publication No. 2017-126203, processing stagnates due to such variations. This results in a decrease in the speed of arithmetic processing.

Other problems and novel features will become apparent from the following description and from the accompanying drawings.

According to an aspect of the present invention, there is provided a semiconductor device including an accelerator section. The accelerator section is capable of performing computation on a plurality of intermediate layers included in a convolutional neural network by using a memory having a plurality of banks capable of changing the read/write status on an individual bank basis. The accelerator section includes a network layer control section. The network layer control section controls a memory control section in such a manner as to change the read/write status assigned to the banks storing input data or output data of the intermediate layers in accordance with the transfer amounts and transfer rates of the input data and output data of the intermediate layers included in the convolutional neural network.

According to the above aspect of the present invention, the semiconductor device is able to maintain a high processing speed by changing the read/write status assigned to the banks for each of the intermediate layers.

BRIEF DESCRIPTION OF THE DRAWINGS

FIG. 3 is a diagram illustrating a convolution product-sum operation of the convolutional neural network according to the first embodiment;

FIG. 7 is a block diagram illustrating a layer computation section according to the first embodiment;

DETAILED DESCRIPTION

Figure 1:
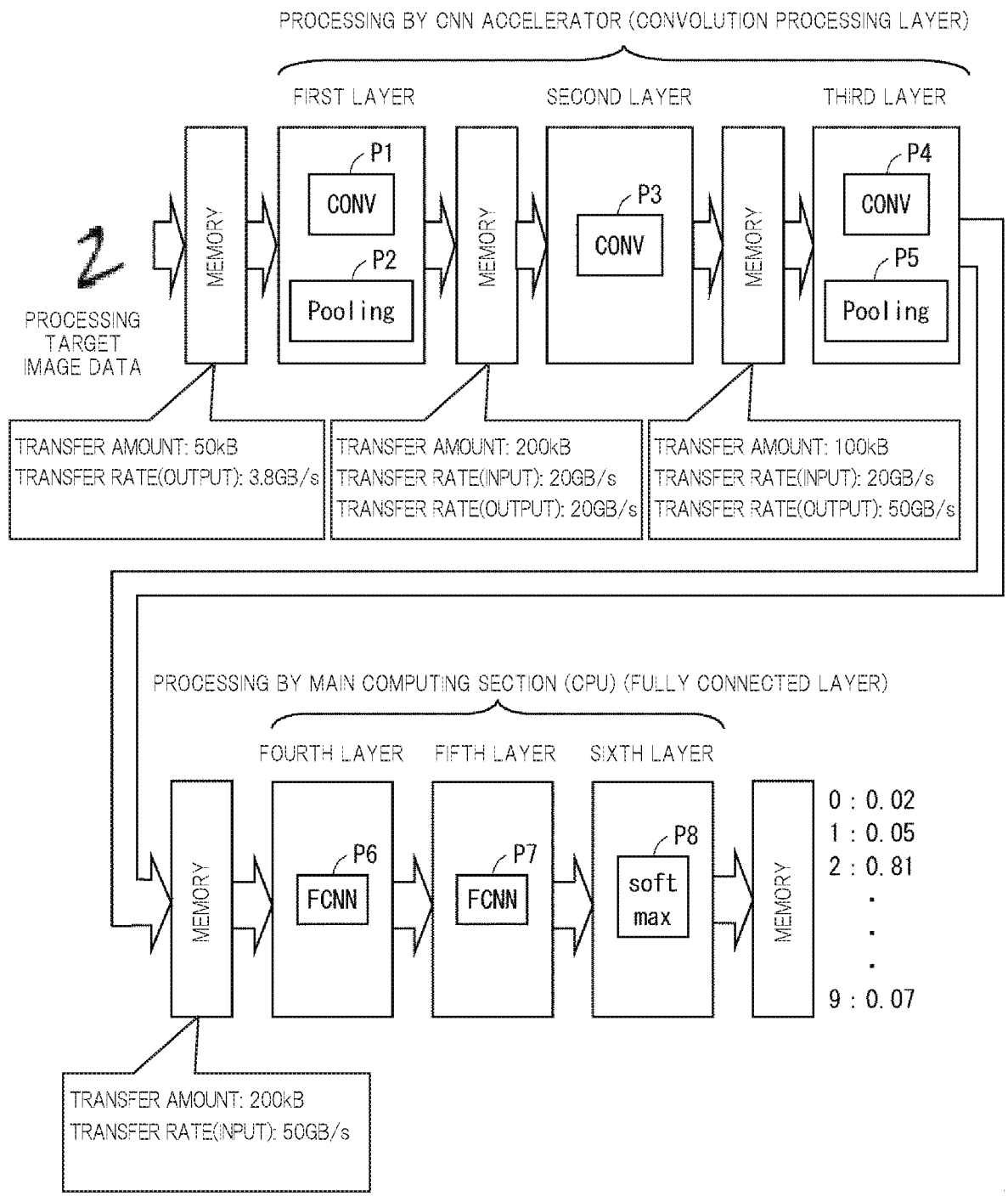
FIG. 1 is a block diagram schematically illustrating a process of a convolutional neural network according to a first embodiment of the present invention.

In the following description and in the accompanying drawings, omissions and simplifications are made as needed for the clarification of explanation. Further, hardware for various elements depicted in the drawings as functional blocks for performing various processes can be implemented by a CPU (Central Processing Unit), a memory, or other circuit while software for such elements is implemented, for instance, by a program loaded into a memory. Therefore, it is to be understood by those skilled in the art that the functional blocks can be variously implemented by hardware only, by software only, or by a combination of hardware and software, and are not to be implemented restrictively by hardware alone or by software alone. Furthermore, like elements in the drawings are designated by like reference numerals and will not be redundantly described.

Moreover, the above-mentioned program can be stored on various types of non-transitory computer readable media and supplied to a computer. The non-transitory computer readable media include various types of tangible recording media. Examples of the non-transitory computer readable media include a magnetic recording medium (e.g., a flexible disk, a magnetic tape, or a hard disk drive), a magneto-optical recording medium (e.g., a magneto-optical disk), a CD-ROM (Read-Only Memory), a CD-R, a CD-R/W, and a semiconductor memory (e.g., a mask ROM, a PROM (Programmable ROM), an EPROM (Erasable PROM), a flash ROM, or a RAM (Random-Access Memory)). The program may be supplied to the computer by using various types of transitory computer readable media. Examples of the transitory computer readable media include an electrical signal, an optical signal, and an electromagnetic wave. The transitory computer readable media can supply the program to the computer through an electric wire, optical fiber, or other wired communication path or through a wireless communication path.

A semiconductor device according to a first embodiment of the present invention performs an image recognition process, as one process, by using a convolutional neural network. Therefore, processing of the convolutional neural network will now be described. FIG. 1 is a block diagram schematically illustrating a process of the convolutional neural network according to the first embodiment. An example depicted in FIG. 1 is an exemplary process of the convolutional neural network. Other forms of the convolutional neural network are also available.

As illustrated in FIG. 1, the convolutional neural network includes a convolution processing layer and a fully connected layer. The convolution processing layer extracts feature points of a processing target image by filtering processing target image data. The fully connected layer converts two-dimensionally arrayed image data to a one-dimensionally arrayed data in order to determine what is indicated by the processing target image data.

The convolution processing layer performs a convolution product-sum operation by applying different filters to the layers. In the example of FIG. 1, the convolution processing layer includes first to third layers, and performs processing in sequence from the first layer to the third layer. Input/output data of each layer is conveyed through a memory. In the example of FIG. 1, a convolution product-sum operation P1 and a pooling process P2 are performed in the first layer, only a convolution product-sum operation P3 is performed in the second layer, and a convolution product-sum operation P4 and a pooling process P5 are performed in the third layer.

Further, the transfer amount and transfer rate of the input/output data significantly vary due to the processing of each layer of the convolution processing layer. For example, in the first layer, the input data is inputted in such a manner that the transfer amount is 50 kB while the transfer rate is 3.8 GB/s, and the output data is outputted in such a manner that the transfer amount is 200 kB while the transfer rate is 20 GB/s. In the second layer, the input data is inputted in such a manner that the transfer amount is 200 kB while the transfer rate is 20 GB/s, and the output data is outputted in such a manner that the transfer amount is 100 kB while the transfer rate is 20 GB/s. In the third layer, the input data is inputted in such a manner that the transfer amount is 100 kB while the transfer rate is 20 GB/s, and the output data is outputted in such a manner that the transfer amount is 200 kB while the transfer rate is 50 GB/s.

The fully connected layer uses a fully connected neural network (FCNN) to perform computation on two-dimensionally arrayed data generated by the convolution processing layer. In the example of FIG. 1, the fully connected layer includes three layers, and performs two processes of the fully connected neural network and one determination process based on one softmax function. The softmax function, which is an activation function, emphasizes an input value not smaller than a predetermined value, and attenuates an input value smaller than the predetermined value. An output value of the fully connected layer indicates what image is most likely represented by the processing target image data. The result obtained from the example of FIG. 1 indicates that a hand-written number "2" is most likely represented by the processing target image data (the number "2" is represented with an 81 percent probability).

The semiconductor device according to the first embodiment performs computation on the convolution processing layer by using an accelerator section, and performs computation on the fully connected layer by using a main computing section (e.g., a CPU) that performs general-purpose computation. In the semiconductor device according to the first embodiment, the convolutional neural network performs an image recognition process by using the above two computing sections, namely, the accelerator section and the main computing section. However, the semiconductor device according to the first embodiment is characterized, for example, in that it is configured to use efficient hardware resources when the accelerator section performs convolution processing. Accordingly, processes performed in the first to third layers will be described in more detail below.

Figure 2:
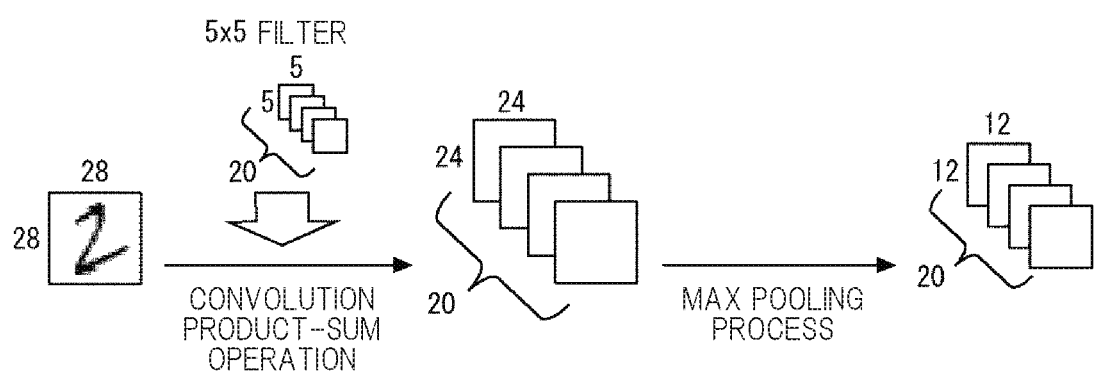
FIG. 2 is a flow diagram schematically illustrating the processing in a convolution processing layer of the convolutional neural network according to the first embodiment.

FIG. 2 is a flow diagram schematically illustrating the processing in the convolution processing layer of the convolutional neural network according to the first embodiment. The example of FIG. 2 illustrates the processing in one layer included in the convolution processing layer. In the second layer depicted in FIG. 1, a pooling process depicted in FIG. 2 is not performed. Further, an activation process may be performed in each layer in the convolution processing layer by using a predetermined activation function after a convolution product-sum operation. However, such an activation process is omitted from FIG. 2.

As illustrated in FIG. 2, the convolution product-sum operation and the pooling process are performed in one layer included in the convolution processing layer. In convolution processing, for example, a filter having 5 horizontal pixels and 5 vertical pixels is superimposed on processing target image data having 28 horizontal pixels and 28 vertical pixels, the values of pixels consequently placed in the same position are integrated, and the integrated values of all pixels in the filter are added up to obtain a new pixel value. This convolution product-sum operation processing will be described in more detail with reference to FIG. 3.

Figure 3:
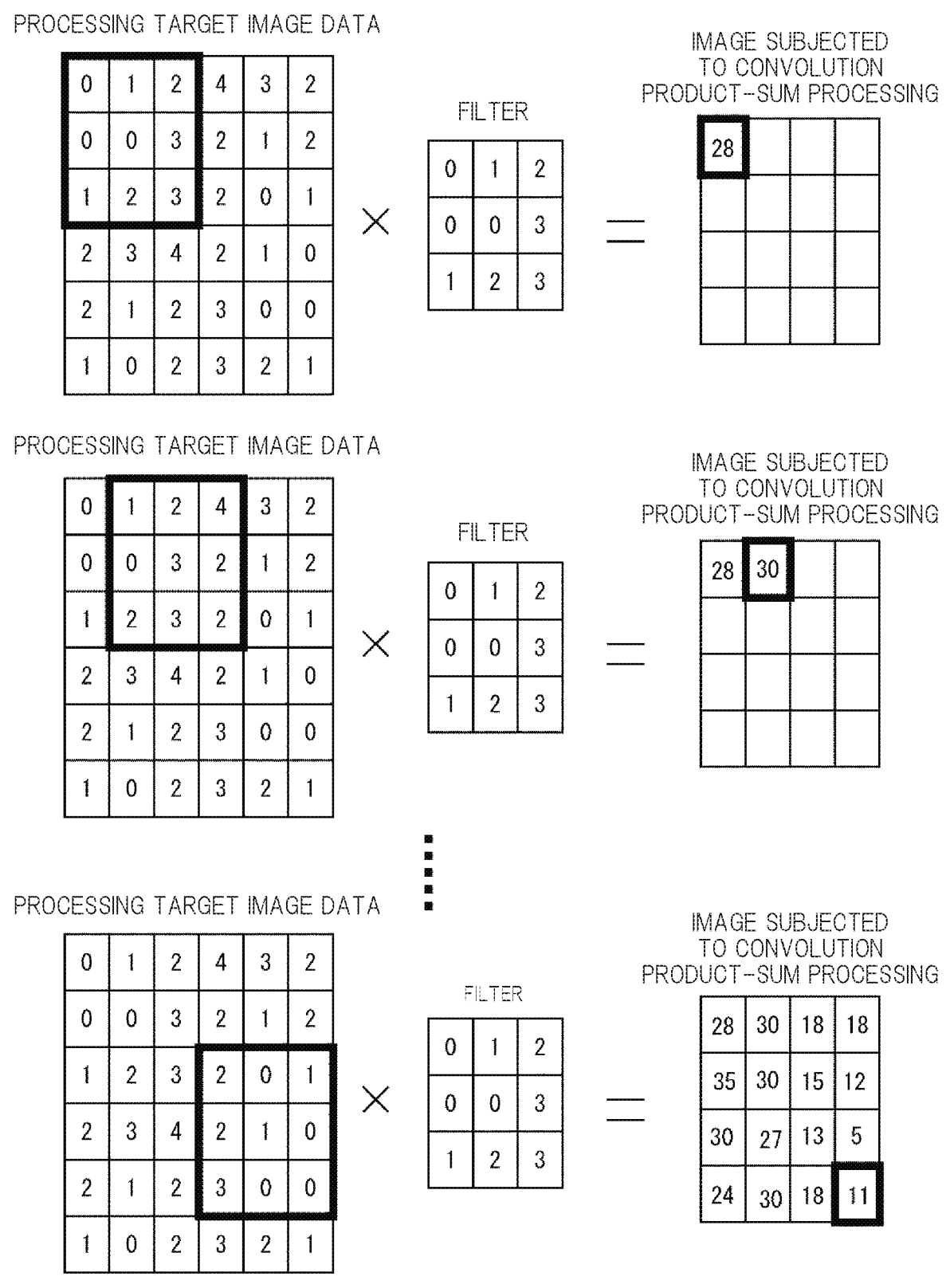

FIG. 3 is a diagram illustrating the convolution product-sum operation of the convolutional neural network according to the first embodiment. In the example of FIG. 3, a 3×3 filter is applied to 6×6 processing target image data. As illustrated in FIG. 3, the convolution product-sum operation is initiated by superimposing the filter on the processing target image data. The integrated values of pixels consequently placed in the same position are then calculated, and the integrated values of all pixels in the filter are added up to calculate the value of one pixel of an image subjected to convolution product-sum processing. Then, in one convolution processing, the position at which the filter is superimposed on the processing target image data is shifted by one pixel at a time so as to superimpose the filter on all pixels of the processing target image data. Subsequently, an image resulting from convolution product-sum processing is generated by calculating a product-sum operation value at each position to which the filter is shifted. In this manner, integration and addition are performed an enormous number of times in the convolution product-sum operation. In a case where predetermined computation is performed an enormous number of times as described above, the time required for computation can be reduced by performing a specific computation in a hardware manner like an accelerator. The amount (stride) by which the position of filter superimposition is shifted is not limited to one pixel, but may be set as appropriate.

In the example of FIG. 2, twenty filters are provided. The convolution product-sum operation processing is performed to generate a convolutionally processed image with respect to each filter. Therefore, the number of generated convolutionally processed images is the same as the number of filters.

Further, as illustrated in FIG. 2, the pooling process is performed in a layer in the convolution processing layer. In the example of FIG. 2, a max pooling process is adopted as the method of pooling processing. The max pooling process is an image data compression method that selects, for example, a predetermined area of an image subjected to convolution product-sum processing and uses the maximum value in the selected area as the representative value of the relevant pixels.

As mentioned earlier, in the convolution processing layer of the convolutional neural network, by the processing of each layer, the transfer amount and transfer rate of data conveyed between the layers significantly vary. Therefore, in order to increase a processing capability in a case where a memory used by the convolution processing layer has a fixed capacity, it is necessary to set the capacity and transfer rate of the memory in consideration of the maximum transfer amount and maximum transfer rate of data conveyed by each layer. However, a memory designed in consideration of the maximum transfer amount and the maximum transfer rate may not actually be implemented because it has a large circuit area and consumes a large amount of power. In view of such circumstances, the semiconductor device according to the first embodiment is configured so that the capacity and transfer rate of an employed memory are variable depending on the processing of each layer. Consequently, the maximum capability of the memory can be made adequate for the maximum transfer amount and the maximum transfer rate while the capacity of the memory and the transfer rate of each bank in the memory are set to be smaller than the maximum transfer amount and the maximum transfer rate. The semiconductor device according to the first embodiment will be described in detail below.

Figure 4:
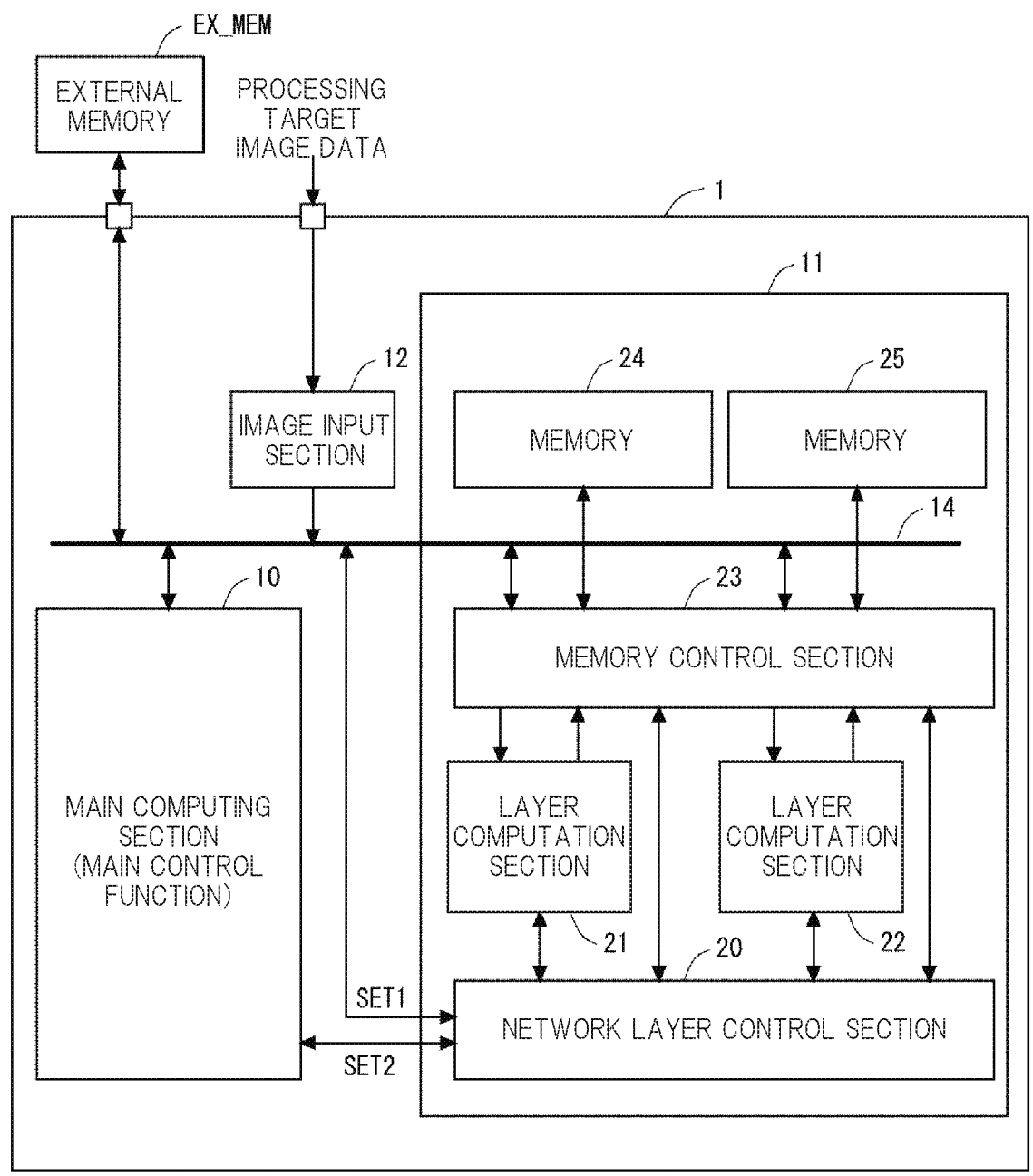
FIG. 4 is a block diagram illustrating a semiconductor device according to the first embodiment.

FIG. 4 is a block diagram illustrating a semiconductor device 1 according to the first embodiment. As illustrated in FIG. 4, the semiconductor device 1 according to the first embodiment includes a main computing section 10, an accelerator section 11, an image input section 12, and a local bus 14. FIG. 4 depicts an external memory EX_MEM as an external part used by the semiconductor device 1. The external memory EX_MEM is, for example, a nonvolatile memory such as a flash memory or a volatile memory such as a DDR-DRAM (Double Data Rate-Dynamic Random Access Memory).

The main computing section 10 is a CPU or other computing section capable of executing a program. In an executed program, the main computing section 10 generates operation setup information SET2 that is to be given to the accelerator section 11 in accordance with user setup information read from the external memory EX_MEM. Processing may be performed, for example, to generate the operation setup information SET2 and store it in the external memory EX_MEM or performed to let another device generate the operation setup information SET2 in advance and store it in the external memory EX_MEM. Subsequently, the stored operation setup information SET2 may be read from the external memory EX_MEM and loaded into the accelerator section 11 when the semiconductor device 1 starts up. In FIG. 4, the operation setup information read from the external memory EX_MEM is designated as the operation setup information SET1. That is to say, the operation setup information SET1 is the same as the operation setup information SET2. As far as the operation setup information SET1 is stored in the external memory EX_MEM, the operation setup information SET2 need not be generated upon each startup. This reduces the time required for startup. Further, the main computing section 10 performs processing concerning the fully connected layer for determining an input image based on the result outputted from the accelerator section 11 in accordance with an executed program. When performing computation on the fully connected layer, the main computing section 10 uses the external memory EX_MEM.

The accelerator section 11 performs a process concerning the convolution processing layer that performs convolution with a predetermined filter applied to an input image, which is one of the processes concerning the convolutional neural network. Further, the accelerator section 11 is coupled to the local bus 14 in such a manner as to be able to communicate with the main computing section 10, the image input section 12, and the external memory EX_MEM.

The image input section 12 reads the processing target image data from the outside of the semiconductor device 1, and conveys the read processing target image data to the accelerator section 11.

The accelerator section 11 will now be described in detail. The accelerator section 11 includes a network layer control section 20, layer computation sections 21, 22, a memory control section 23, and memories 24, 25.

The network layer control section 20 controls the memory control section 23 in such a manner as to change the read/write status assigned to banks in the memories 24, 25 for storing input data or output data of intermediate layers in accordance with the transfer amounts and transfer rates of the input data and output data of the intermediate layers included in the convolutional neural network. Further, in a case where a preceding intermediate layer among a plurality of successive intermediate layers is designated as the first intermediate layer and a subsequent intermediate layer is designated as the second intermediate layer, the network layer control section 20 controls the memory control section 23 in such a manner that a bank to which a writable state is assigned in a process concerning the first intermediate layer is assigned to a readable state in a process concerning the second intermediate layer.

More specifically, the network layer control section 20 increases the number of banks assigned to the same read/write attributes when the transfer amounts of input data and output data increase, and increases the number of parallelly accessible banks when the transfer rates of input data and output data increase. From a different point of view, if the transfer amount of input data to be inputted to an intermediate layer is larger than the capacity of one bank, the network layer control section 20 sets the number of readable banks so that the total capacity is larger than the transfer amount. Further, if the transfer amount of output data outputted from an intermediate layer is larger than the capacity of one bank, the network layer control section 20 sets the number of writable banks so that the total capacity is larger than the transfer amount.

Furthermore, if the transfer rate of output data of a preceding intermediate layer among the successive intermediate layers or the transfer rate of input data of a subsequent intermediate layer among the successive intermediate layers is greater than a bus transfer rate per bank of the bus for coupling the memory control section 23 to the banks, the network layer control section 20 sets the number of readable banks in such a manner that the transfer rate per bank is smaller than the bus transfer rate. If the transfer rate of output data outputted from an intermediate layer is greater than the bus transfer rate of the bus coupling the memory control section 23 to the banks, the network layer control section 20 sets the number of writable banks in such a manner that the transfer rate per bank is smaller than the bus transfer rate. In short, the network layer control section 20 sets the write status of a bank in such a manner as to provide the transfer amount and transfer rate during a write to the bank for data transfer between the successive intermediate layers as well as the transfer amount and transfer rate during a read from the bank.

The layer computation sections 21, 22 are processing blocks that perform the same process. The layer computation sections 21, respectively perform arithmetic processing including a convolution product-sum operation on processing target image data elements in each of the intermediately layers included in the convolutional neural network. More specifically, the layer computation sections 21, 22 perform, for example, a convolution product-sum operation for generating a new image (a so-called feature map) by applying a filter to the processing target image data, an activation process for activating each pixel value by applying a predetermined activation function to the feature map generated by the convolution product-sum operation, and a pooling process for compressing the feature map.

The memory control section 23 not only switches between the readable state and writable state of each bank, which is an access unit in the memories 24, 25, but also performs routing of data transmission and reception between the layer computation sections 21, 22 and the memories 24, 25.

The memories 24, 25 are storage areas that the layer computation sections 21, 22 use through the memory control section 23. The memories 24, 25 store input/output data of the layer computation sections 21, 22 in the intermediate layers included in the convolutional neural network, and each include a plurality of banks that is independently readable and writable.

In the example of FIG. 4, the two layer computation sections in the accelerator section 11 share the network layer control section 20 and the memory control section 23. Each of the layer computation sections is able to process a predetermined number of images. Therefore, when many images are to be processed, a plurality of layer computation sections is used to parallelly process the many images. That is to say, based on the number of processing target images, the accelerator section 11 increases or decreases the number of layer computation sections to be parallelly operated. Consequently, when a small number of images are to be processed, the semiconductor device 1 according to the first embodiment reduces the power consumption by decreasing the number of layer computation sections to be operated.

Further, the semiconductor device 1 according to the first embodiment is configured so that two layer computation sections share one set of the network layer control section 20 and memory control section 23. Owning to the above configuration, the semiconductor device 1 according to the first embodiment is able to easily allocate memory areas to the layer computation sections and prevent data interference.

The semiconductor device 1 according to the first embodiment is characterized, for example, in the assignment and use of banks in a memory. Therefore, operations of the semiconductor device 1 according to the first embodiment will be described briefly and clearly by explaining about only one of the layer computation sections and only one of the memories. It is assumed that the layer computation section 22 operates in the same manner as the layer computation section 21, and that the memory 25 has the same configuration as and operates in the same manner as the memory 24.

Figure 5:
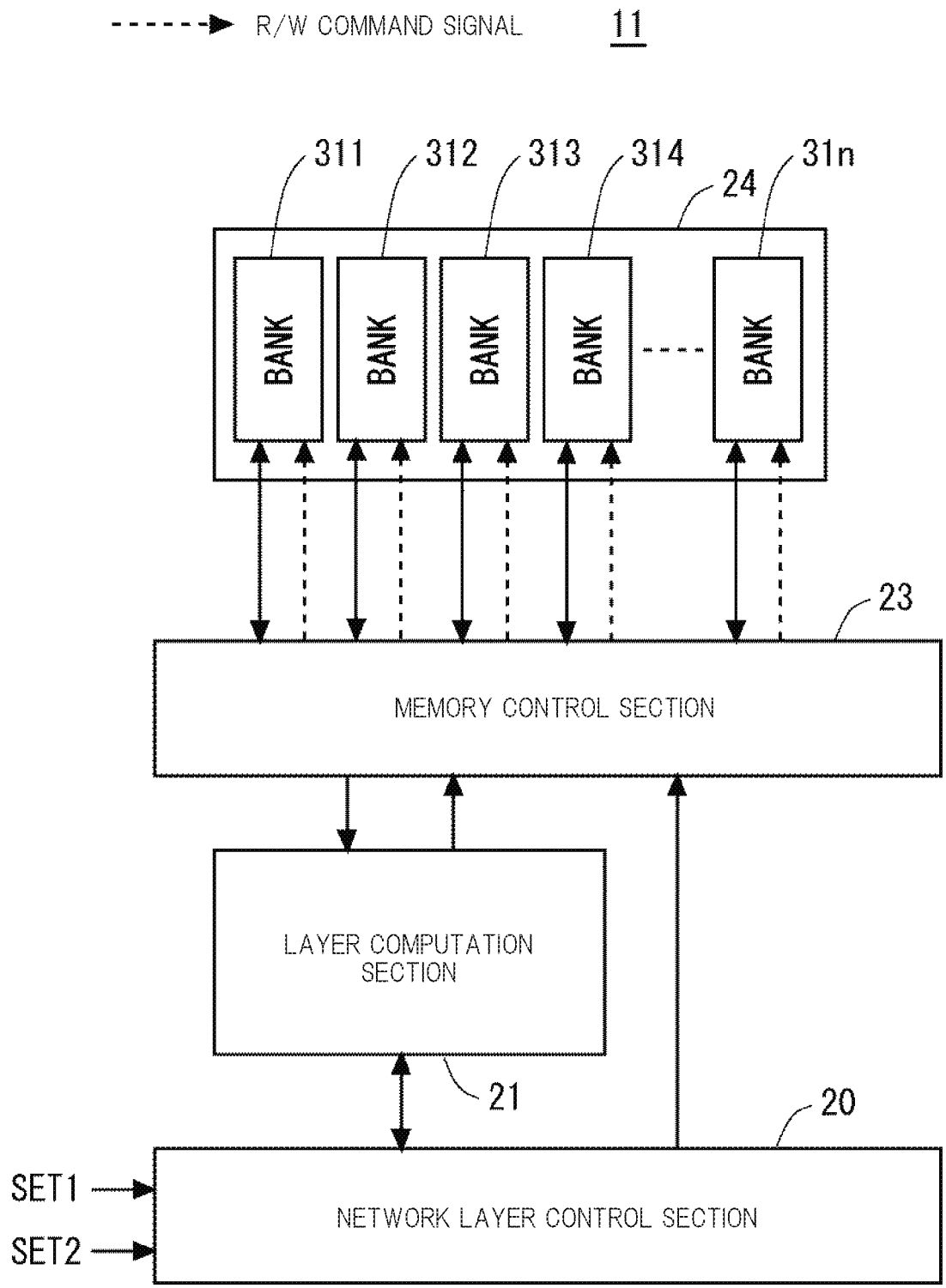
FIG. 5 is a block diagram illustrating a configuration of a memory in an accelerator section according to the first embodiment.

The accelerator section 11 will now be described in more detail. FIG. 5 is a block diagram illustrating a configuration of the memory 24 in the accelerator section 11. As illustrated in FIG. 5, the memory 24 includes a plurality of banks. In the example of FIG. 5, the memory 24 includes banks 311-31$n$ ($n$ is an integer indicating the number of banks; the same applies hereafter). The banks 311-31$n$ are each capable of independently communicating with the memory control section 23. Further, the banks 311-31$n$ are each capable of independently switching between a readable state (read state) and a writable state (write state). The memory control section 23 gives a read/write command signal (R/W command signal in FIG. 5) to each bank and controls the read/write status on an individual bank basis. As a memory for each bank, for example, a SRAM (Static Random Access Memory) or other rapidly accessible storage element is used.

Figure 6:
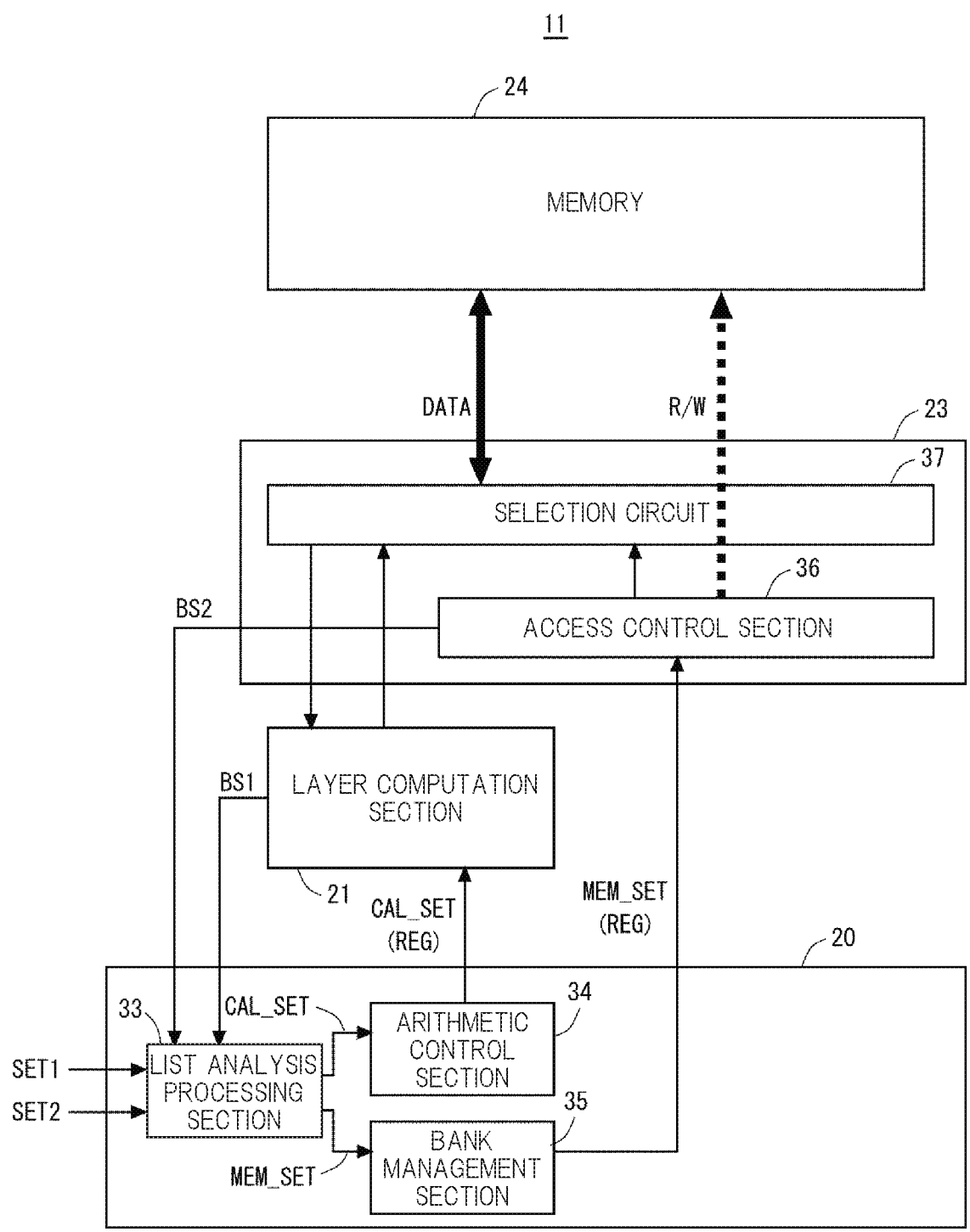
FIG. 6 is a block diagram illustrating configurations of a network layer control section and a memory control section that are included in the accelerator section according to the first embodiment.

Next, FIG. 6 is a block diagram illustrating configurations of the network layer control section 20 and memory control section 23 in the accelerator section 11 according to the first embodiment.

The operation setup information SET1 including arithmetic processing information CAL_SET and memory setup information MEM_SET (or operation setup information SET2; the following description is given on the assumption that the network layer control section 20 operates based on the operation setup information SET2) is given to the network layer control section 20. The arithmetic processing information CAL_SET concerns each intermediately layer, and includes information indicative of a convolution product-sum operation performed by the layer computation section 21, an activation function applied by the layer computation section 21, and the type of a pooling process applied by the layer computation section 21. Based on the arithmetic processing information CAL_SET, the network layer control section 20 controls the layer computation section 21. Meanwhile, the memory setup information MEM_SET concerns each intermediate layer, and includes a setting for choosing between a bank read state and a bank write state and a setting for choosing between sequential bank access and parallel bank access. Based on the memory setup information MEM_ SET, the network layer control section 20 controls the memory control section 23. More specifically, the configurations and operations of the network layer control section 20 and memory control section 23 are as described below.

As illustrated in FIG. 6, the network layer control section 20 includes a list analysis processing section 33, an arithmetic control section 34, and a bank management section 35. Upon receiving the operation setup information SET2, the list analysis processing section 33 analyzes the received operation setup information, and extracts the arithmetic processing information CAL_SET and memory setup information MEM_SET included in the operation setup information. The list analysis processing section 33 then outputs the extracted arithmetic processing information CAL_SET to the arithmetic control section 34, and outputs the extracted memory setup information MEM_SET to the bank management section 35. In this instance, the list analysis processing section 33 monitors both a busy signal BS1 and a busy signal BS2. The busy signal BS1 is used to report that the process of the layer computation section 21 is completed. The busy signal BS2 is used to report that the process of the memory control section 23 is completed. Although details will be described later, the arithmetic processing information CAL_ SET and memory setup information MEM_SET concerning each convolutional layer are written within the operation setup information SET2. When the busy signals BS1, BS2 both indicate that the busy state is cleared, the list analysis processing section 33 changes the layer of the arithmetic processing information CAL_SET to be given to the arithmetic control section 34 and the layer of the memory setup information MEM_SET to be given to the bank management section 35.

Based on the arithmetic processing information CAL_ SET received from the list analysis processing section 33, the arithmetic control section 34 gives a physical control signal representative of a setting written within the arithmetic processing information CAL_SET to the layer computation section 21. Based on the memory setup information MEM_SET received from the list analysis processing section 33, the bank management section 35 gives a physical control signal representative of a setting written within the memory setup information MEM_SET to an access control section 36 in the memory control section 23.

More specifically, the arithmetic control section 34 and the bank management section 35 are address decoders. A logical address indicative of the address of a register to which a setting is to be given is written within the arithmetic processing information CAL_SET and memory setup information MEM_SET outputted from the list analysis processing section 33. Therefore, the accelerator section 11 according to the first embodiment uses the arithmetic control section 34 and the bank management section 35 to convert the logical address written within the arithmetic processing information CAL_SET and memory setup information MEM_SET to a physical address. Then, based on the physical address, the arithmetic control section 34 writes the setting indicated by arithmetic processing information CAL_ SET (REG) into a register of the layer computation section 21. Meanwhile, based on the physical address obtained upon conversion, the bank management section 35 writes the setting indicated by memory setup information MEM_SET (REG) into a register of the memory control section 23. The arithmetic processing information CAL_ SET (REG) is the arithmetic processing information CAL_ SET within which various settings are associated with physical addresses, and the contents of the settings are the same as those of the arithmetic processing information CAL_SET. Further, the memory setup information MEM_ SET (REG) is the memory setup information MEM_SET within which various settings are associated with physical addresses, and the contents of the settings are the same as those of the memory setup information MEM_SET.

The memory control section 23 includes an access control section 36 and a selection circuit 37. Based on the memory setup information MEM_SET given from the bank management section 35, the access control section 36 sets a transfer path for data handled by the selection circuit 37. The selection circuit 37 selects a bank that acts as a transfer source for input data inputted to the layer computation section 21, and selects a bank that acts as a transfer destination for output data outputted from the layer computation section 21. The memory control section 23 then uses a data transfer path formed by the access control section 36 and the selection circuit 37 in order to perform data transmission/reception between the layer computation section 21 and a bank in the memory 24.

The layer computation section 21 will now be described in detail. FIG. 7 is a block diagram illustrating the layer computation section 21 according to the first embodiment. The layer computation section 22 has the same configuration as the layer computation section 21. Therefore, the following description deals with the layer computation section 21. As the layer computation section 21 may be in a plurality of different forms, FIG. 7 depicts two different circuit forms. The upper half of FIG. 7 depicts the layer computation section 21a in a first form, and the lower half of FIG. 7 depicts the layer computation section 21b in a second form.

The layer computation section 21a includes a convolution product-sum operation section 40, an activation processing section 41, and a pooling processing section 42. The convolution product-sum operation section 40 superimposes a filter having a predetermined image size on the processing target image data, shifts the position of filter superimposition, calculates the product of the pixel values of the processing target image data and the pixel values of the filter at each position of filter superimposition, computes the total sum of the products concerning the pixels included in the filter, and generates a product-sum operation result image. Filters used by the convolution product-sum operation section 40, the number of input channels indicative of the number of types of filters, and the number of output channels indicative of the number of product-sum operation result images to be outputted are specified by the arithmetic processing information CAL_SET.

The activation processing section 41 is disposed between the convolution product-sum operation section 40 and the pooling processing section 42. If the pixel values included in the product-sum operation result image do not satisfy predefined conditions, the activation processing section 41 performs an activation process on the product-sum operation result image by applying a predetermined activation function to the pixel values in order to replace the pixel values with prescribed values. The type of the activation function used in the activation process performed by the convolution product-sum operation section 40 is specified by the arithmetic processing information CAL_SET. For example, a ReLU (Rectified Linear Unit, rectifier, rectified linear function) may be used as the activation function.

The pooling processing section 42 groups the pixels in the product-sum operation result image into predetermined sizes, uses representative values of the grouped pixels as new pixel values, and generates a processed image formed of the new pixels values. The arithmetic processing information CAL_SET specifies the type of the pooling method to be used in the pooling process. For example, the max pooling process may be used as the pooling method.

Meanwhile, the layer computation section 21b depicted in the lower half of FIG. 7 is obtained by adding a first selection circuit (e.g., a selection circuit 43) and a second selection circuit (e.g., a selection circuit 44) to the layer computation section 21a. The selection circuit 43 selectively delivers input data to the convolution product-sum operation section 40. The selection circuit 44 selectively outputs, to the memory control section 23, output data outputted from the pooling processing section 42. Using the selection circuits 43, 44 decreases the number of simultaneously processable channels, but reduces the wiring between the memory control section 23 and the layer computation section 21. Although FIG. 7 depicts an exemplary configuration in which the selection circuits 43, 44 are disposed in the layer computation section 21, the selection circuits 43, 44 may be alternatively disposed in the selection circuit 37 of the memory control section 23. Incidentally, convolutional neural network processing is such that the amount of data transfer generally decreases with an increase in layer depth. Therefore, an alternative is to let the selection circuit 37 bit-combine the results of a plurality of channels and output the result of bit combination on a single channel.

Figure 8:
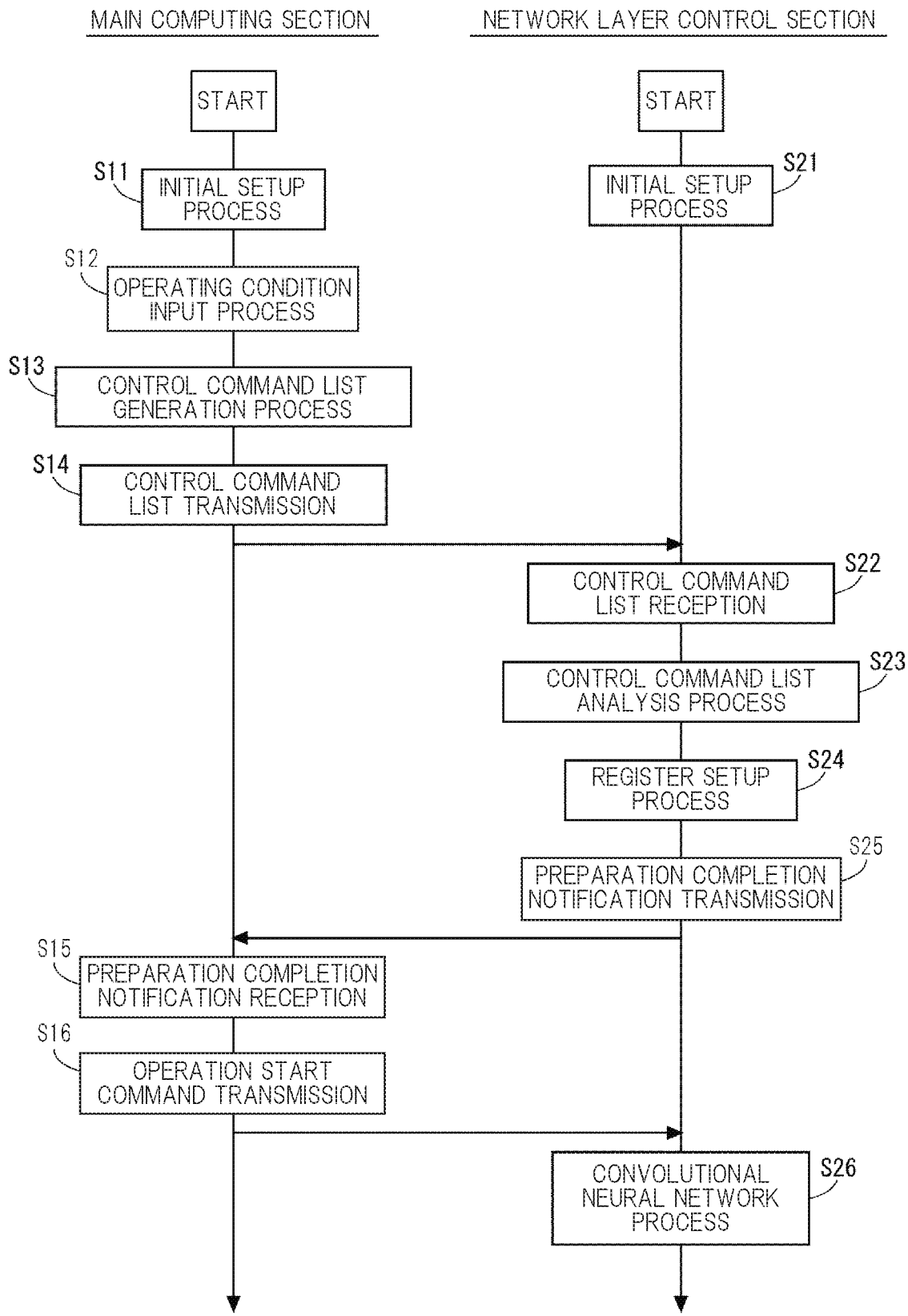
FIG. 8 is a sequence diagram illustrating operations that are performed by the semiconductor device according to the first embodiment in order to start convolution processing.

Operations of the semiconductor device 1 according to the first embodiment will now be described. First of all, FIG. 8 is a sequence diagram illustrating operations that are performed by the semiconductor device 1 according to the first embodiment in order to start convolution processing. As illustrated in FIG. 8, when started up, the semiconductor device 1 according to the first embodiment first performs an initial setup process in the main computing section 10 and in the network layer control section 20 (steps S11 and S21). In the initial setup process, a reset process is performed to place the circuitry in a predefined state.

Next, the main computing section 10 performs an operating condition input process of reading operating conditions from a built-in memory 13 (step S12). In step S12, the operating conditions may be alternatively acquired from the outside. Subsequently, the main computing section 10 generates a control command list (e.g., operation setup information SET2) in accordance with the inputted operating conditions (step S14). Next, the main computing section transmits the operation setup information SET2, which is generated in step S14, to the network layer control section 20 (step S14), and then the network layer control section 20 receives the operation setup information SET2 from the main computing section 10 (step S22).

Upon receiving the operation setup information SET2, the network layer control section 20 performs a control command list analysis process of analyzing the received operation setup information SET2 in the list analysis processing section 33 (step S23). The network layer control section 20 performs a register setup process of allowing the arithmetic control section 34 and the bank management section 35 to enter operational settings in the registers of the layer computation sections 21, 22 and memory control section 23 in accordance with the result of analysis processing in step S23 (step S24). Subsequently, the network layer control section transmits a preparation completion notification to the main computing section 10 (step S25).

Upon receiving the preparation completion notification from the network layer control section 20 (step S15), the main computing section 10 transmits an operation start command to the network layer control section 20 (step S16). Upon receiving the operation start command from the main computing section 10, the network layer control section 20 starts a convolutional neural network process (step S26).

Figure 9:
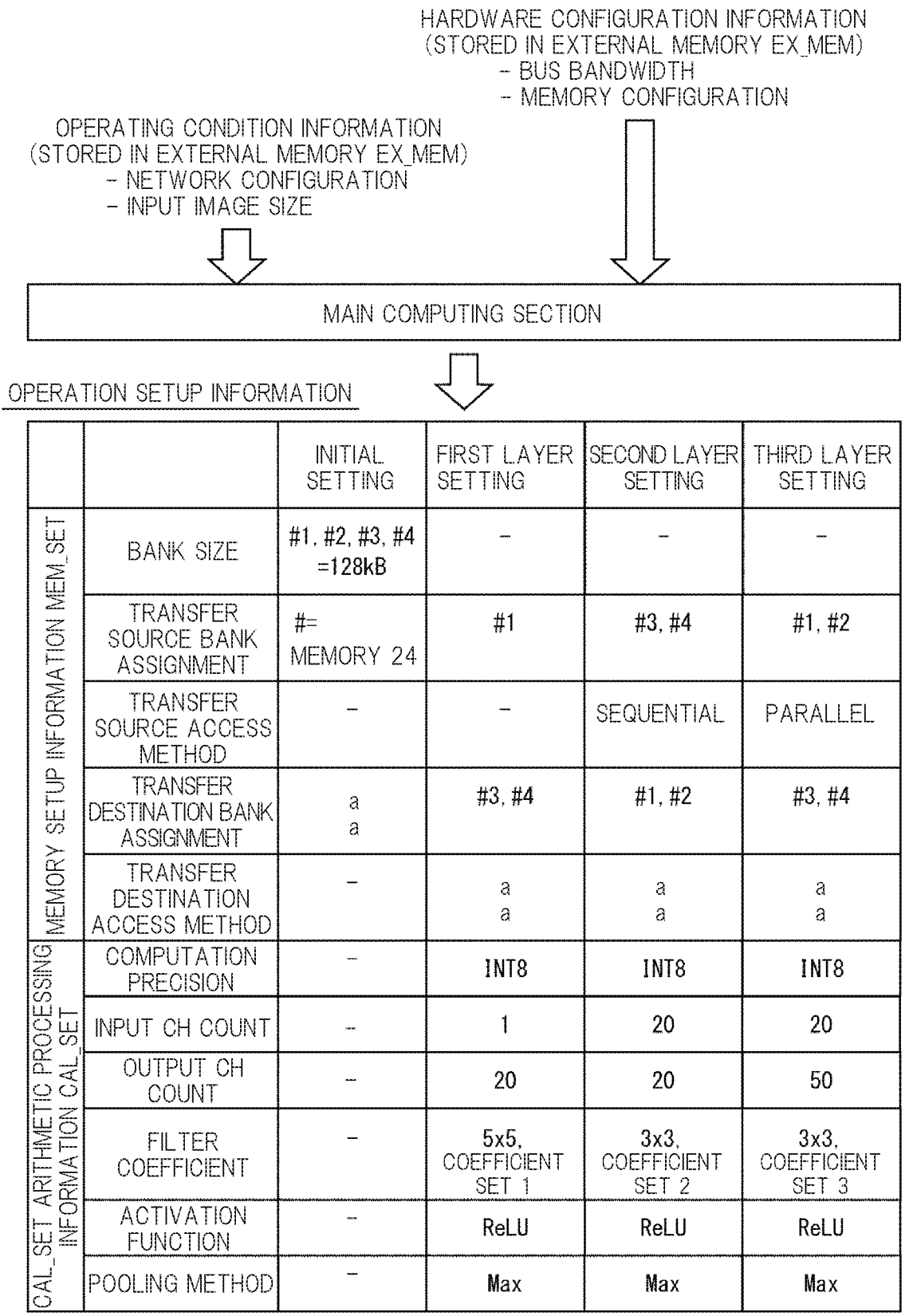
FIG. 9 is a diagram illustrating operation setup information in the semiconductor device according to the first embodiment.

In the semiconductor device 1 according to the first embodiment, the operations of the accelerator section 11 are determined based on the control command list given to the network layer control section 20. Therefore, a method of generating the control command list (e.g., operation setup information) will now be described in detail. FIG. 9 is a diagram illustrating the operation setup information in the semiconductor device 1 according to the first embodiment.

FIG. 9 depicts an example in which the main computing section 10 generates the operation setup information SET2. In FIG. 9, an example of the operation setup information SET2 is depicted in a portion to which the arrow extended from the main computing section 10 is pointed. Based on operating condition information and hardware configuration information stored in the external memory EX_MEM, the main computing section 10 generates the operation setup information SET2. The operating condition information is given from a user of the semiconductor device 1, and stored in the external memory EX_MEM. The operating condition information includes at least information concerning a network configuration and input image size information for specifying the size of an input image to be inputted to the semiconductor device 1. The hardware configuration information is provided, for example, by a manufacturer who supplies the semiconductor device 1, and is stored in the external memory EX_MEM. The hardware configuration information includes at least bus bandwidth information (bus bandwidth in FIG. 9) about each of the banks in the bus for coupling the memory control section 23 to the banks in the memory 24, and memory configuration information (memory configuration in FIG. 9) indicative of the capacities and the number of banks in the memory 24.

The operation setup information SET2 generated by the main computing section 10 will now be described with reference to the example depicted in FIG. 9. As depicted in FIG. 9, the operation setup information SET2 includes the memory setup information MEM_SET and the arithmetic processing information CAL_SET. In FIG. 9, the operation setup information SET2 is expressed in a tabular form. However, the operation setup information SET2 may alternatively be expressed, for example, in the form of a source code. In the example of FIG. 9, setup parameters included in the operation setup information SET2 are vertically indicated, and the values of the setup parameters are horizontally indicated. Further, as indicated in FIG. 9, the operation setup information SET2 is such that the setup parameters are written for each convolution processing layer. Furthermore, the example of FIG. 9 indicates what memory is to be used by the accelerator section 11 during an operation, and indicates an initial setting representative of the storage capacity of a bank in the memory to be used.

The setup parameters depicted in FIG. 9 will now be described. The memory setup information MEM_SET includes, as the setup parameters, at least a bank size, a transfer source bank assignment, a transfer source access method, a transfer destination bank assignment, and a transfer destination access method. The bank size is a setup parameter indicative of the numbers and the storage capacities of banks included in the memory 24 that are to be used for processing in an intermediate layer of the convolution processing layer. In consideration of the maximum capacity and maximum transfer band of data, which are required for intermediate layer computation depending on the memory configuration information within the hardware configuration information and on the network configuration and input image size written in the operating condition information, the main computing section 10 determines the numbers of the banks (or the number of banks) to be specified by the bank size. Further, based on the memory configuration information, the main computing section 10 determines the storage capacities of the banks to be used.

When used as an initial setting, the transfer source bank assignment is a setup parameter that specifies the memory to be used as a transfer source memory. Meanwhile, when used as intermediate layer settings (the first to third layer settings in FIG. 9), the transfer source bank assignment is a setup parameter that specifies the banks to be used for processing in each layer. The transfer source bank assignment determines the number of banks in such a manner as to satisfy the transfer amount of input data of a target layer targeted for parameter generation and satisfy the transfer amount of output data of a layer preceding the target layer. Further, the number of a bank unoccupied during the processing of the target layer is specified as the number of the bank to be written as the setup parameter for the transfer source bank assignment.

Moreover, the number of banks to be written as the setup parameter for the transfer source bank assignment also increases or decreases in accordance with a data transfer rate. If, for example, a maximum bus bandwidth per bank is exceeded by either the transfer rate of input data of the target layer or the transfer rate of output data of the layer preceding the target layer, the number of banks to access is increased so that the transfer rate per bank does not exceed the maximum bus bandwidth.

The transfer amount of data in the semiconductor device 1 according to the first embodiment will now be described. In the convolutional neural network, filters to be applied to the intermediate layers are predetermined, and the data size of input image data is also known in advance. Further, the method of pooling processing is obvious from network configuration information. That is to say, it is possible to predetermine the degree of data compression after a convolution product-sum operation. Therefore, the semiconductor device 1 according to the first embodiment is able to become aware of the data size of output data from the data sizes of input data inputted to the intermediate layers, the types of filters applied to the intermediate layers, and a compression ratio in pooling processing. Consequently, the semiconductor device 1 according to the first embodiment uses the data size of output data as the transfer amount of output data and as the transfer amount of input data.

Additionally, the transfer rate in the semiconductor device 1 according to the first embodiment will now be described. In the semiconductor device 1 according to the first embodiment, the transfer rate of input data is similar in meaning to the data processing rate of input data of the layer computation section 21. Further, the transfer rate of output data has a data processing rate for generating the output data of the layer computation section 21. More specifically, a convolution product-sum operation is performed by applying a filter to image data inputted to the layer computation section 21. The transfer rate of input data can be calculated by dividing the data capacity (e.g., transfer amount) of input data by the time required for performing the convolution product-sum operation on input data read from the memory 24. Moreover, in the layer computation section 21, the output data is generated through a convolution product-sum operation, an activation process, and a pooling process. The transfer rate of the output data can be calculated by dividing the capacity (e.g., transfer amount) of the output data by the time interval between the instant at which the output of the output data is started subsequently to the above-mentioned processes to the instant at which the output of the output data is completed. That is to say, the transfer rate of data may be regarded as the input or output processing rate of the layer computation section 21. Consequently, this document uses the expression "data transfer rate" as the indexes of input and output data processing rates of the layer computation section 21.

The transfer source access method is a setup parameter that specifies whether banks assigned as transfer source banks are to be sequentially accessed or parallelly accessed. The transfer source access method determines the method of accessing the banks in such a manner as to satisfy the transfer rate of input data of a target layer targeted for parameter generation and satisfy the transfer rate of output data of a layer preceding the target layer. More specifically, if the maximum bus bandwidth per bank is exceeded by either the transfer rate of input data of the target layer or the transfer rate of output data of the layer preceding the target layer, the number of banks to be parallelly accessed is increased so that the transfer rate per bank does not exceed the maximum transfer rate. When such parallel access is to be used, parallel access is used as the transfer source access method. Meanwhile, if the maximum bus bandwidth per bank is exceeded by neither the transfer rate of input data of the target layer nor the transfer rate of output data of the layer preceding the target layer, sequential access is used as the transfer source access method for the target layer.

When used as an initial setting, the transfer destination bank assignment is a setup parameter that specifies the memory to be used as a transfer destination memory. Meanwhile, when used as intermediate layer settings (the first to third layer settings in FIG. 9), the transfer destination bank assignment is a setup parameter that specifies the banks to be used for processing in each layer. The transfer destination bank assignment determines the number of banks in such a manner as to satisfy the transfer amount of output data of a target layer targeted for parameter generation and satisfy the transfer amount of input data of a layer subsequent to the target layer. Further, the number of a bank unoccupied during the processing of the target layer is specified as the number of the bank to be written as the setup parameter for the transfer destination bank assignment.

Moreover, the number of banks to be written as the setup parameter for the transfer destination bank assignment also increases or decreases in accordance with the data transfer rate. If, for example, the maximum bus bandwidth per bank is exceeded by either the transfer rate of output data of the target layer or the transfer rate of input data of the layer subsequent to the target layer, the number of banks to access is increased so that the transfer rate per bank does not exceed the maximum bus bandwidth.

The transfer destination access method is a setup parameter that specifies whether banks assigned as transfer destination banks are to be sequentially accessed or parallelly accessed. The transfer destination access method determines the method of accessing a bank in such a manner as to satisfy the transfer rate of output data of a target layer targeted for parameter generation and satisfy the transfer rate of input data of a layer subsequent to the target layer. More specifically, if the maximum bus bandwidth per bank is exceeded by either the transfer rate of output data of the target layer or the transfer rate of input data of the layer subsequent to the target layer, the number of banks to be parallelly accessed is increased so that the transfer rate per bank does not exceed the maximum transfer rate. When such parallel access is to be used, parallel access is used as the transfer destination access method. Meanwhile, if the maximum bus bandwidth per bank is exceeded by neither the transfer rate of output data of the target layer nor the transfer rate of input data of the layer subsequent to the target layer, sequential access is used as the transfer destination access method for the target layer.

The memory setup information MEM_SET depicted in FIG. 9 is an example of setup parameters determined by the above-described setup method. In FIG. 9, bank numbers are indicated by a combination of the symbol # and a numeral indicative of a bank number.

More specifically, FIG. 9 depicts an example in which banks #1 to #4 included in the memory 24 have a storage capacity of 128 kB and are used for processing in the convolution processing layer. Therefore, as the initial settings of the memory setup information MEM_SET, the written bank size indicates that banks #1 to #4 each have a capacity of 128 kB, and the written transfer source bank assignment and transfer destination bank assignment both indicate the memory 24.

Further, in the example of the memory setup information MEM_SET depicted in FIG. 9, the written first layer setting indicates that the transfer source bank assignment is bank #1 is, and that the transfer destination bank assignment is banks #3 and #4, and further that the transfer destination access method is sequential access. As only one bank is written as the transfer source bank assignment for the first layer, sequential access is used as the transfer source access method even when it is not specified.

The written second layer setting indicates that the transfer source bank assignment is banks #3 and #4 while the transfer source access method is sequential access, and that the transfer destination bank assignment is banks #1 and #2 while the transfer destination access method is parallel access. The transfer source bank assignment and transfer source access method written as the second layer setting are the same as the transfer destination bank assignment and transfer destination access method written as the first layer setting. The reason is that the second layer performs processing on the result of processing in the first layer, and that using a bank where the result of processing in a preceding layer is stored as a transfer source bank of a subsequent layer is advantageous for processing efficiency enhancement.

The written third layer setting indicates that the transfer source bank assignment is banks #1 and #2 while the transfer source access method is parallel access, and that the transfer destination bank assignment is banks #3 and #4 while the transfer destination access method is parallel access. As is the case with the second layer setting, the transfer source bank assignment and transfer source access method written as the third layer setting are the same as the transfer destination bank assignment and transfer destination access method written as the preceding second layer setting.

Operations based on the example of the memory setup information MEM_SET depicted in FIG. 9 will be described later in more detail with reference to FIGS. 13 to 15.

The arithmetic processing information CAL_SET included in the operation setup information SET2 will now be described. In the example of FIG. 9, the setup parameters included in the arithmetic processing information CAL_SET are computation precision, the number of input channels (input ch count in FIG. 9), the number of output channels (output ch count in FIG. 9), a filter coefficient, an activation function, and a pooling method. The setup parameters included in the arithmetic processing information CAL_SET are determined by the network configuration written in the operating condition information.

The computation precision is the precision of computation in the layer computation section 21. In the example of FIG. 9, the computation accuracy specified for the first to third layer settings is 8-bit integer precision.

The number of input channels is a parameter indicating the number of processing target images (e.g., input data) inputted to each layer. In the example of FIG. 9, the specified number of input channels is "1" for the first layer, "16" for the second layer, and "16" for the third layer.

The number of output channels is a parameter indicating the number of image data (e.g., output data) outputted from each layer. In the example of FIG. 9, the specified number of output channels is "16" for the first layer, "16" for the second layer, and "32" for the third layer. In the convolutional neural network, the number of output channels is determined in accordance with the number of filter groups applied to the input data.

The filter coefficient is a parameter indicative of information that specifies a filter size and coefficient set. In the example of FIG. 9, the filter coefficient specified for the first layer represents a group of filters that has a size of 5×5 and is designated as coefficient set 1. The filter coefficient specified for the second layer represents a group of filters that has a size of 3×3 and is designated as coefficient set 2. The filter coefficient specified for the third layer represents a group of filters that has a size of 3×3 and is designated as coefficient set 3.

The activation function is a parameter that specifies the activation function to be used in the activation processing section 41. In the example of FIG. 9, ReLU is specified as the activation function for each of the first to third layers. The pooling method is a parameter that specifies the pooling method to be applied to the pooling process performed in the pooling processing section 42. In the example of FIG. 9, max pooling is specified as the pooling method for each of the first to third layers.

The method of determining the transfer source bank assignment, transfer source access method, transfer destination bank assignment, and transfer destination access method in the semiconductor device 1 according to the first embodiment will now be described in detail.

Figure 10:
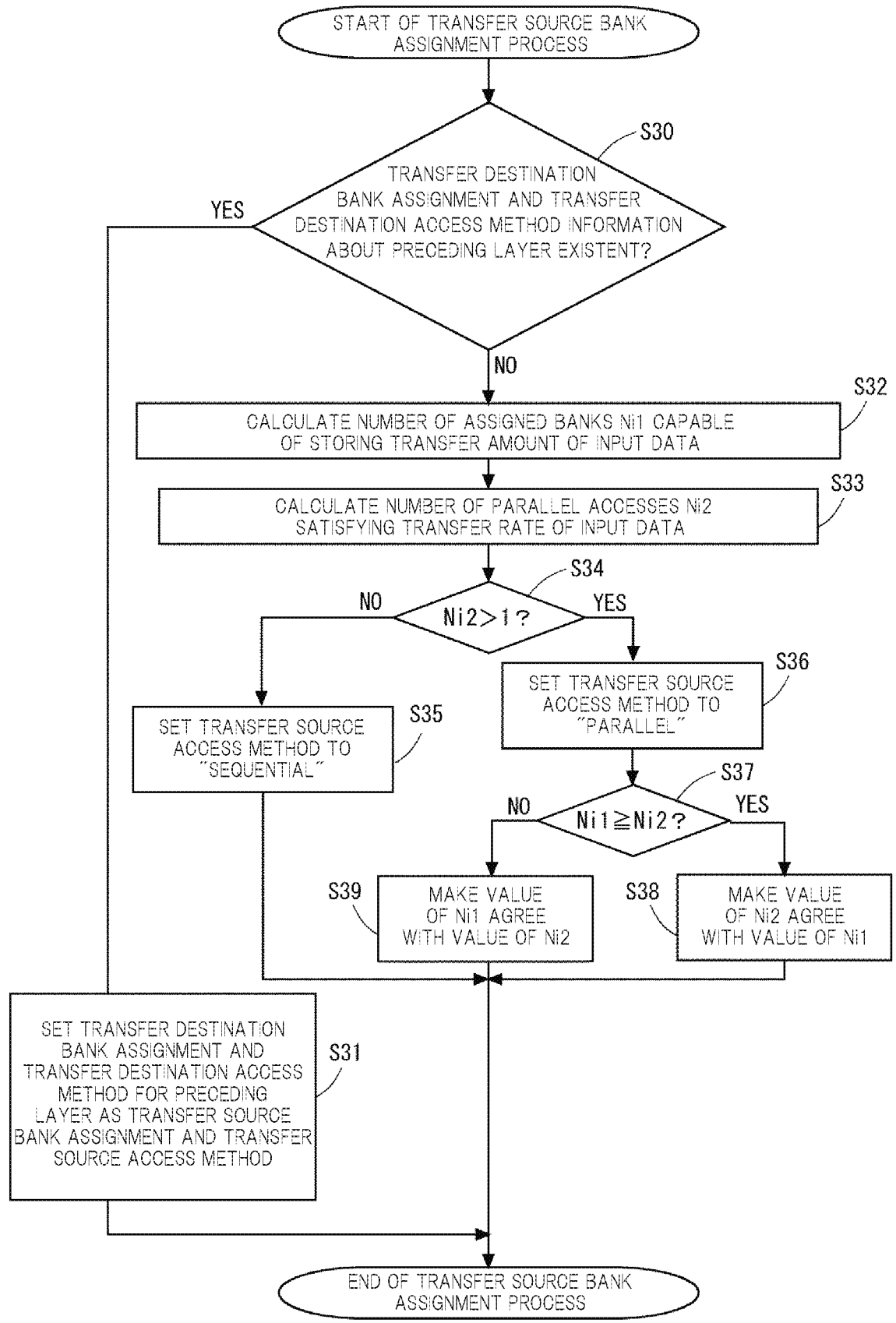
FIG. 10 is a flowchart illustrating a procedure for determining a transfer source bank assignment and a transfer source access method in the semiconductor device according to the first embodiment.

FIG. 10 is a flowchart illustrating a procedure for determining the transfer source bank assignment and transfer source access method in the semiconductor device 1 according to the first embodiment. As illustrated in FIG. 10, when the settings concerning a transfer source bank are to be determined, a check is performed to determine whether transfer destination bank assignment information and transfer destination access method information about a preceding layer exist (step S30). If the transfer destination bank assignment information and transfer destination access method information about the preceding layer exist, the transfer source bank assignment and transfer source access method for the preceding layer are set as the transfer source bank assignment and transfer source access method (step S31).

If, by contrast, it is determined in step S30 that the transfer destination bank assignment information and transfer destination access method information about the preceding layer do not exist, the transfer source bank assignment and transfer source access method for a current layer are determined based on the transfer amount and transfer rate of input data of the current layer.

More specifically, first of all, the number of assigned banks Ni1 capable of storing the transfer amount of input data of the current layer is calculated (step S32). In step S32, the number of banks capable of storing the input data is calculated as the number of assigned banks Ni1 by comparing the data size of the input data with the storage capacity per bank.

Next, the number of parallel accesses Ni2 that satisfies the transfer rate of the input data is calculated (step S33). In step S33, the transfer rate of the input data is compared with the maximum bandwidth per bank. If the maximum bandwidth is greater than the transfer rate, the number of parallel accesses Ni2 is set to 1. If, by contrast, the maximum bandwidth is smaller than the transfer rate, the maximum bandwidth is multiplied by an integer until it is greater than the transfer rate, and the number of parallel accesses Ni2 is set to a multiple greater than the transfer rate.

Next, a check is performed to determine whether the number of parallel accesses Ni2 is greater than 1 (step S34). If the number of parallel accesses Ni2 in step S34 is 1, the transfer source access method is set to "sequential" (step S35). If, by contrast, the number of parallel accesses Ni2 in step S34 is greater than 1, the transfer source access method is set to "parallel" (step S36). Subsequently, the number of assigned banks Ni1 and the number of parallel accesses Ni2 are adjusted. More specifically, if the comparison between the number of assigned banks Ni1 and the number of parallel accesses Ni2 indicates that the number of assigned banks Ni1 is equal to or greater than the number of parallel accesses Ni2, a value indicative of the number of parallel accesses Ni2 is updated by a value indicative of the number of assigned banks Ni1 so that the number of assigned banks Ni1 agrees with the number of parallel accesses Ni2 (steps S37 and S38). If, by contrast, the number of assigned banks Ni1 is smaller than the number of parallel accesses Ni2, the value indicative of the number of assigned banks Ni1 is updated by a value indicative of the number of parallel accesses Ni2 so that the number of assigned banks Ni1 agrees with the number of parallel accesses Ni2 (steps S37 and S39). If, for example, the number of assigned banks Ni1 is 3 and the number of parallel accesses Ni2 is 2, steps S37 and S38 are performed to update the number of parallel accesses Ni2 from 2 to 3. If, as another example, the number of assigned banks Ni1 is 1 and the number of parallel accesses Ni2 is 2, steps S37 and S39 are performed to update the number of assigned banks Ni1 from 1 to 2.

When processing is performed as illustrated in FIG. 10, the access method and the number of assigned transfer source banks (the number of assigned banks Ni1) in a minimum configuration for satisfying the transfer amount and transfer rate of data inputted to the layer computation section on an individual layer basis are determined. The number of parallel accesses Ni2 is used to determine whether sequential access or parallel access is used as the method of accessing a transfer source bank. Further, if the number of parallel accesses Ni2 is greater than the number of assigned banks Ni1, the number of parallel accesses Ni2 is used to correct the number of assigned banks Ni1 in a case where parallel access is to be used. Meanwhile, if the number of parallel accesses Ni2 is smaller than the number of assigned banks Ni1, the number of parallel accesses Ni2 is corrected to agree with the number of assigned banks Ni1.

Figure 11:
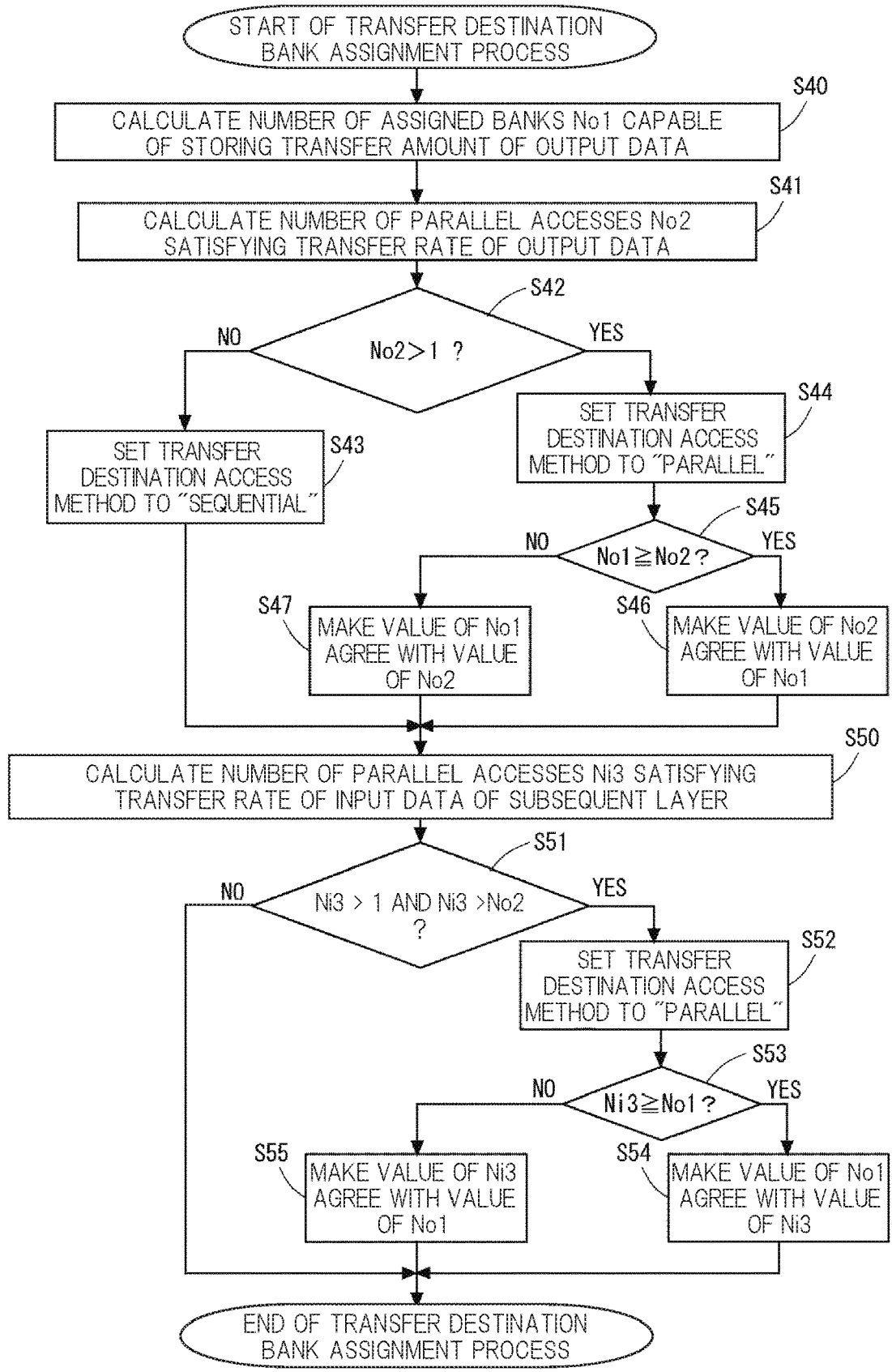
FIG. 11 is a flowchart illustrating a procedure for determining a transfer destination bank assignment and a transfer destination access method in the semiconductor device 1 according to the first embodiment.

Next, FIG. 11 is a flowchart illustrating a procedure for determining the transfer destination bank assignment and transfer destination access method in the semiconductor device 1 according to the first embodiment. As illustrated in FIG. 11, when the settings concerning a transfer destination bank are to be determined, first of all, they are determined based on the transfer amount and transfer rate of output data of a current layer.

More specifically, the number of assigned banks No1 capable of storing the transfer amount of output data of the current layer is calculated (step S40). In step S40, the number of banks capable of storing the output data is calculated as the number of assigned banks No1 by comparing the data size of the output data with the storage capacity per bank.

Next, the number of parallel accesses No2 that satisfies the transfer rate of the output data is calculated (step S41). In step S41, the transfer rate of the output data is compared with the maximum bandwidth per bank. If the maximum bandwidth is greater than the transfer rate, the number of parallel accesses No2 is set to 1. If, by contrast, the maximum bandwidth is smaller than the transfer rate, the maximum bandwidth is multiplied by an integer until it is greater than the transfer rate, and the number of parallel accesses No2 is set to a multiple greater than the transfer rate.

Next, a check is performed to determine whether the number of parallel accesses No2 is greater than 1 (step S42). If the number of parallel accesses No2 in step S42 is 1, the transfer destination access method is set to "sequential" (step S43). If, by contrast, the number of parallel accesses No2 in step S42 is greater than 1, the transfer destination access method is set to "parallel" (step S44). Subsequently, the number of assigned banks No1 and the number of parallel accesses No2 are adjusted. More specifically, if the comparison between the number of assigned banks No1 and the number of parallel accesses No2 indicates that the number of assigned banks No1 is equal to or greater than the number of parallel accesses No2, a value indicative of the number of parallel accesses No2 is updated by a value indicative of the number of assigned banks No1 so that the number of assigned banks No1 agrees with the number of parallel accesses No2 (steps S45 and S46). If, by contrast, the number of assigned banks No1 is smaller than the number of parallel accesses No2, the value indicative of the number of assigned banks No1 is updated by the value indicative of the number of parallel accesses No2 so that the number of assigned banks No1 agrees with the number of parallel accesses No2 (steps S45 and S47). If, for example, the number of assigned banks No1 is 3 and the number of parallel accesses No2 is 2, steps S45 and S46 are performed to update the number of parallel accesses No2 from 2 to 3.

If, as another example, the number of assigned banks No1 is 1 and the number of parallel accesses No2 is 2, steps S45 and S47 are performed to update the number of assigned banks No1 from 1 to 2.

When processing is performed as illustrated in FIG. 11, the access method and the number of assigned transfer destination banks (the number of assigned banks No1) in a minimum configuration for satisfying the transfer amount and transfer rate of data outputted from the layer computation section on an individual layer basis and the transfer amount and transfer rate of data inputted to a subsequent layer disposed subsequently to a processing target layer are determined. The number of parallel accesses No2 and the number of parallel accesses Ni3 are used to determine whether sequential access or parallel access is used as the method of accessing a transfer destination bank. Further, if the number of parallel accesses No2 and the number of parallel accesses Ni3 are greater than the number of assigned banks No1, the number of parallel accesses No2 and the number of parallel accesses Ni3 are used to correct the number of assigned banks Not in a case where parallel access is to be used. Meanwhile, if the number of parallel accesses No2 and the number of parallel accesses Ni3 are smaller than the number of assigned banks No1, the number of parallel accesses No2 and the number of parallel accesses Ni3 are corrected to agree with the number of assigned banks No1.

Next, in a transfer destination bank assignment process, the number of parallel accesses Ni3 that satisfies the transfer rate of input data of a subsequent layer is calculated (step S50). In step S50, the number of parallel accesses Ni3 is calculated based on the transfer rate of output data and the maximum bandwidth per bank, as is the case with step S41.

After completion of step S50, a setting update decision process is performed to determine whether or not to change the transfer destination bank assignment and transfer destination access method that are set based on the transfer amount and transfer rate of the output data (step S51). In step S51, whether parallel access is necessary for satisfying the transfer rate of input data of the subsequent layer is determined by checking whether the number of parallel accesses Ni3 is greater than 1. Further, in step S51, the number of parallel accesses Ni3 concerning the input of the subsequent layer is compared with the number of parallel accesses No2 concerning the output of the current layer in order to determine whether the transfer rate of the input data of the subsequent layer is satisfied within the range of the number of parallel accesses No2. FIG. 11 assumes that decision criteria used in step S51 are represented by relational expressions Ni3>1 and Ni3>No2.

If it is determined in step S51 that the transfer amount and transfer rate required for the input of the subsequent layer are satisfied by the number of assigned banks No1 and the number of parallel accesses No2, which are derived from the transfer amount and transfer rate of the current layer (if step S51 is answered NO), the number of assigned transfer destination banks and the transfer destination access method that are calculated in steps S40 to S47 are adopted for the current layer.

Meanwhile, if it is determined in step S47 that the transfer amount and transfer rate required for the input of the subsequent layer are not satisfied by the number of assigned banks No1 and the number of parallel accesses No2, which are derived from the transfer amount and transfer rate of the current layer (if step S51 is answered YES), the transfer destination access method and the number of assigned banks Ni1 are reviewed (steps S52 to S55).

In step S52, the transfer destination access method is changed to "parallel" without regard to the access method set in steps S43 and S44. Subsequently, the number of assigned banks Ni1 and the number of parallel accesses No3 are adjusted. More specifically, if the comparison between the number of assigned banks No1 and the number of parallel accesses Ni3 indicates that the number of assigned banks No1 is equal to or greater than the number of parallel accesses Ni3, a value indicative of the number of parallel accesses Ni3 is updated by a value indicative of the number of banks No1 so that the number of assigned banks No1 agrees with the number of parallel accesses Ni3 (steps S53 and S55). If, by contrast, the number of assigned banks No1 is smaller than the number of parallel accesses Ni3, the value indicative of the number of assigned banks No1 is updated by the value indicative of the number of parallel accesses Ni3 so that the number of assigned banks No1 agrees with the number of parallel accesses Ni3 (steps S53 and S54). If, for example, the number of assigned banks No1 is 1 and the number of parallel accesses Ni3 is 2, steps S53 and S54 are performed to update the number of parallel accesses Ni3 from 1 to 2. If, as another example, the number of assigned banks No1 is 3 and the number of parallel accesses Ni3 is 2, steps S53 and S55 are performed to update the number of parallel accesses Ni3 from 2 to 3.

The sum of the number of assigned banks Ni1, which is calculated in steps S38 and S39 in FIG. 10, and the number of assigned banks No1, which is calculated in steps S46, S47, S54, and S55 in FIG. 11, is calculated to be equal to or smaller than the total number of banks L prepared as hardware resources in the semiconductor device 1 on an individual layer basis. That is to say, the maximum value of the sum of the number of assigned banks Ni1 and the number of assigned banks No1, which are determined on an individual layer basis through the processing depicted in FIGS. 10 and 11, is calculated to be Ni1+No1≤L. Further, the number of assigned banks Ni1 and the number of assigned banks No1 may be increased as appropriate within the range of the total number of banks L while the values calculated as indicated in FIGS. 10 and 11 are regarded as the minimum values.

The memory setup information MEM_SET to be used in the semiconductor device 1 according to the first embodiment is generated by following the procedures depicted in FIGS. 10 and 11. The procedures for generating the memory setup information MEM_SET may be performed by a computer installed separately from the semiconductor device 1 or by the main computing section 10 in the semiconductor device 1.

Figure 12:
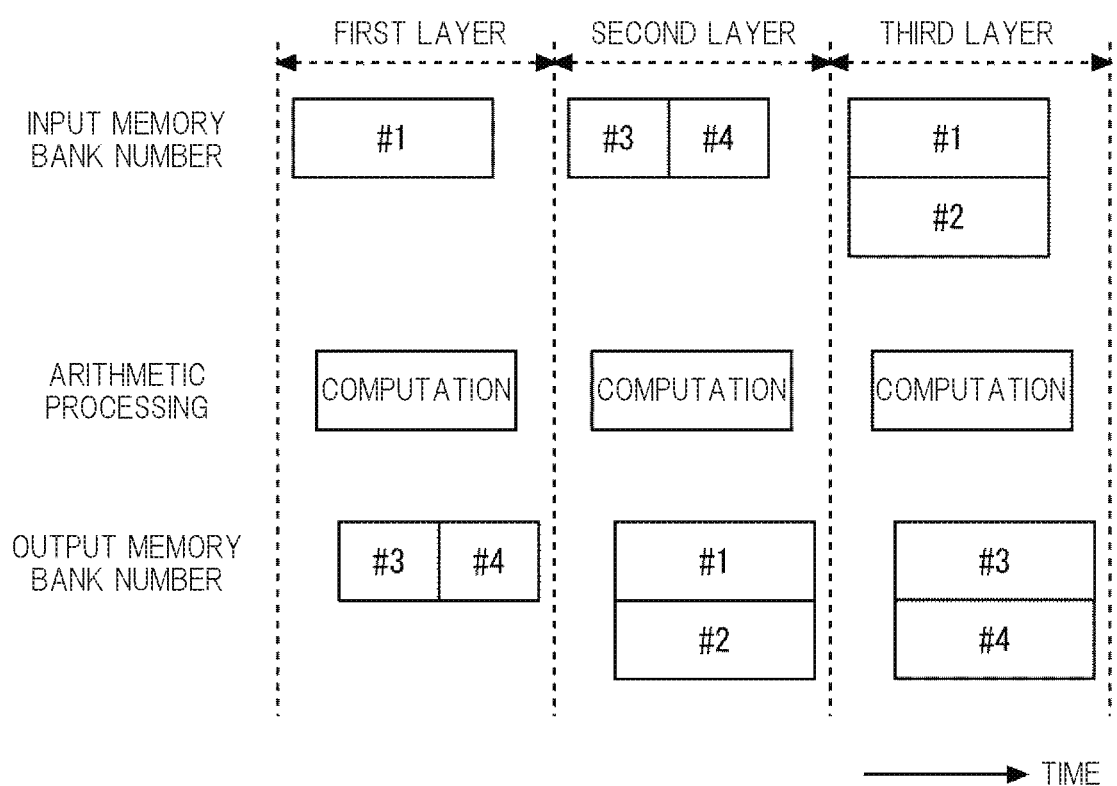
FIG. 12 is a timing diagram illustrating the operations of the semiconductor device according to the first embodiment.

Operations performed by the semiconductor device 1 according to the first embodiment in order to perform computation in the convolution processing layer will now be described. The following description mainly deals with operations of the accelerator section 11. FIG. 12 is a timing diagram illustrating the operations of the semiconductor device 1 according to the first embodiment. In FIG. 12, #1 represents a first bank, #2 represents a second bank, #3 represents a second bank, and #4 represents a fourth bank.

As illustrated in FIG. 12, when performing a process concerning the first layer, the accelerator section 11 according to the first embodiment causes the network layer control section 20 to perform setup for the first layer in the layer computation section 21 and in the memory control section 23. More specifically, the network layer control section 20 sets the memory control section 23 so that bank #1 is placed in a readable state, and that banks #2 and #3 are placed in a writable state. Further, sequential access is set for banks #3 and #4. The accelerator section 11 then reads data from bank #1, and causes the layer computation section 21 to perform computation on the read data. Then, the layer computation section 21 sequentially accesses banks #3 and #4 and writes output data into them.

When performing a process concerning the second layer, the accelerator section 11 according to the first embodiment causes the network layer control section 20 to perform setup for the second layer in the layer computation section 21 and in the memory control section 23. More specifically, when the accelerator section 11 performs a process concerning the second layer, the network layer control section 20 sets the memory control section 23 so that banks #1 and #2 are placed in a writable state, and that banks #3 and #4 are placed in a readable state. The reason is that data generated in the first layer is stored in banks #3 and #4. Further, as regards the second layer, parallel access is set for banks #1 and #2. The accelerator section 11 then sequentially accesses banks #3 and #4 to read data, and causes the layer computation section 21 to perform computation on the read data. Then, the layer computation section 21 parallelly accesses banks #1 and #2 and writes output data into them.

When performing a process concerning the third layer, the accelerator section 11 according to the first embodiment causes the network layer control section 20 to perform setup for the third layer in the layer computation section 21 and in the memory control section 23. More specifically, when the accelerator section 11 performs a process concerning the third layer, the network layer control section 20 sets the memory control section 23 so that banks #3 and #4 are placed in a writable state, and that banks #1 and #2 are placed in a readable state. The reason is that data generated in the second layer is stored in banks #1 and #2. Further, as regards the third layer, parallel access is set for banks #1 and #2 and for banks #3 and #4. The accelerator section 11 then parallelly accesses banks #1 and #2 to read data, and causes the layer computation section 21 to perform computation on the read data. Then, the layer computation section 21 parallelly accesses banks #3 and #4 and writes output data into them.

A data transfer state of each layer depicted in FIG. 12 will now be described in detail. The following describes the data transfer state of each layer depicted in FIG. 12 with reference to an example in which processing is performed in the convolution processing layer of the convolutional neural network as illustrated in FIG. 1. The following description assumes that the maximum bus bandwidth per bank is 30 GB/s.

Figure 13:
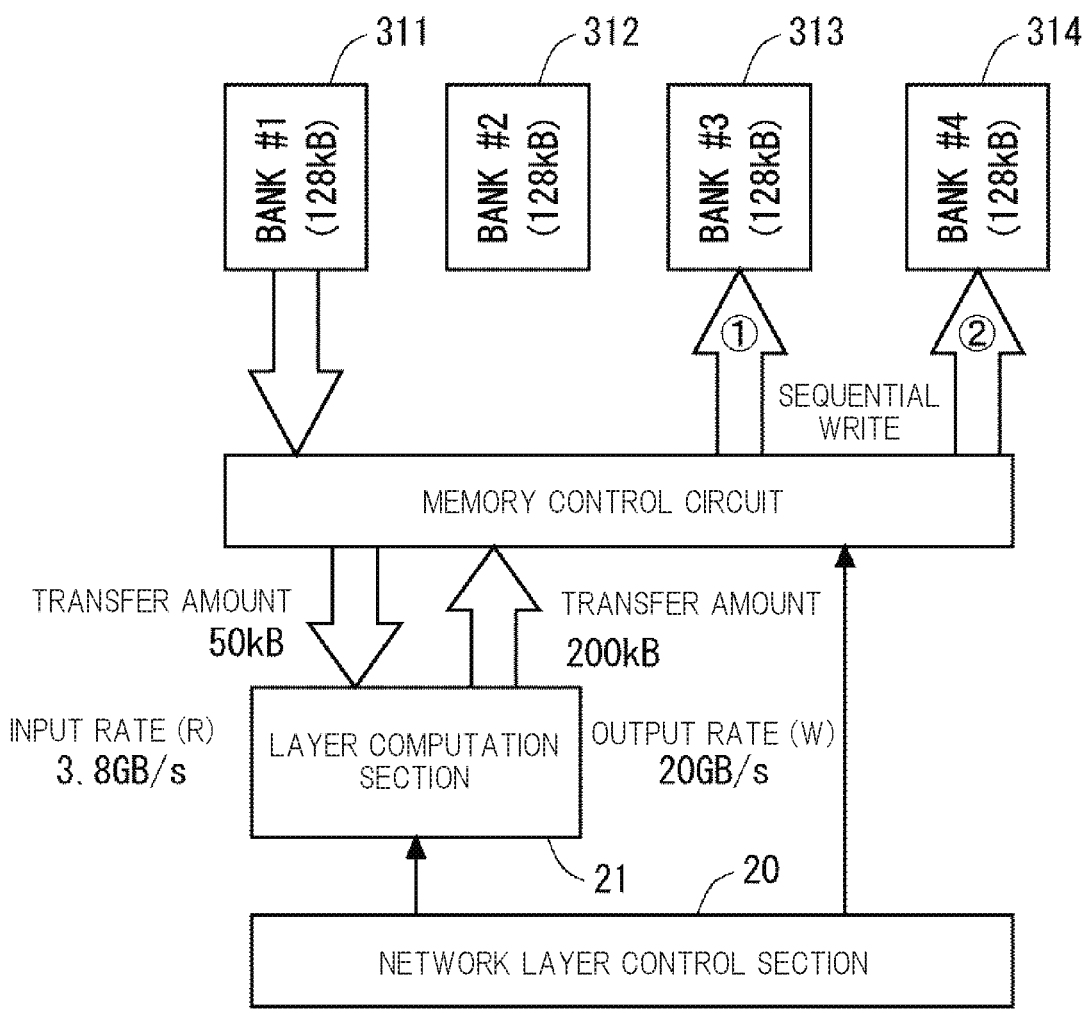
FIG. 13 is a diagram illustrating a data transfer state in a case where processing concerning a first layer of the semiconductor device according to the first embodiment is performed.

FIG. 13 is a diagram illustrating the data transfer state in a case where processing concerning the first layer of the semiconductor device according to the first embodiment is performed. In the example of FIG. 13, the transfer amount of input data given to the layer computation section 21 is 50 kB, and the transfer rate of input data (input rate in FIG. 13) when it is read by the layer computation section 21 is 3.8 GB/s. Further, in the example of FIG. 13, the transfer amount of output data outputted from the layer computation section 21 is 200 kB, and the transfer rate of output data (output rate in FIG. 13) when it is written into a bank by the layer computation section 21 is 20 GB/s. In the example of the first layer depicted in FIG. 13, it is assumed, according to the above transfer amounts of input/output data, that one bank is assigned as the transfer source of the input data, and that two banks are assigned as the transfer destinations of the output data. Further, sequential access is set as the method of accessing the banks to be assigned as the transfer destinations because the required transfer rate is smaller than the maximum bus bandwidth per bank. Although a relevant description will be given later with reference to FIG. 14, even when the banks of the first layer are written into by sequential access, the read rate of the second layer is satisfied because the transfer rate required for reading the input data of the second layer is smaller than the maximum bus bandwidth. Based on the above-described settings, the layer computation section 21 in the accelerator section 11, which performs processing concerning the first layer, performs convolution product-sum operation processing, activation processing, and pooling processing. Encircled numbers in FIG. 13 indicate the order of sequential accessing. Encircled numbers are also used in the same manner in FIG. 14 and subsequent figures.

Figure 14:
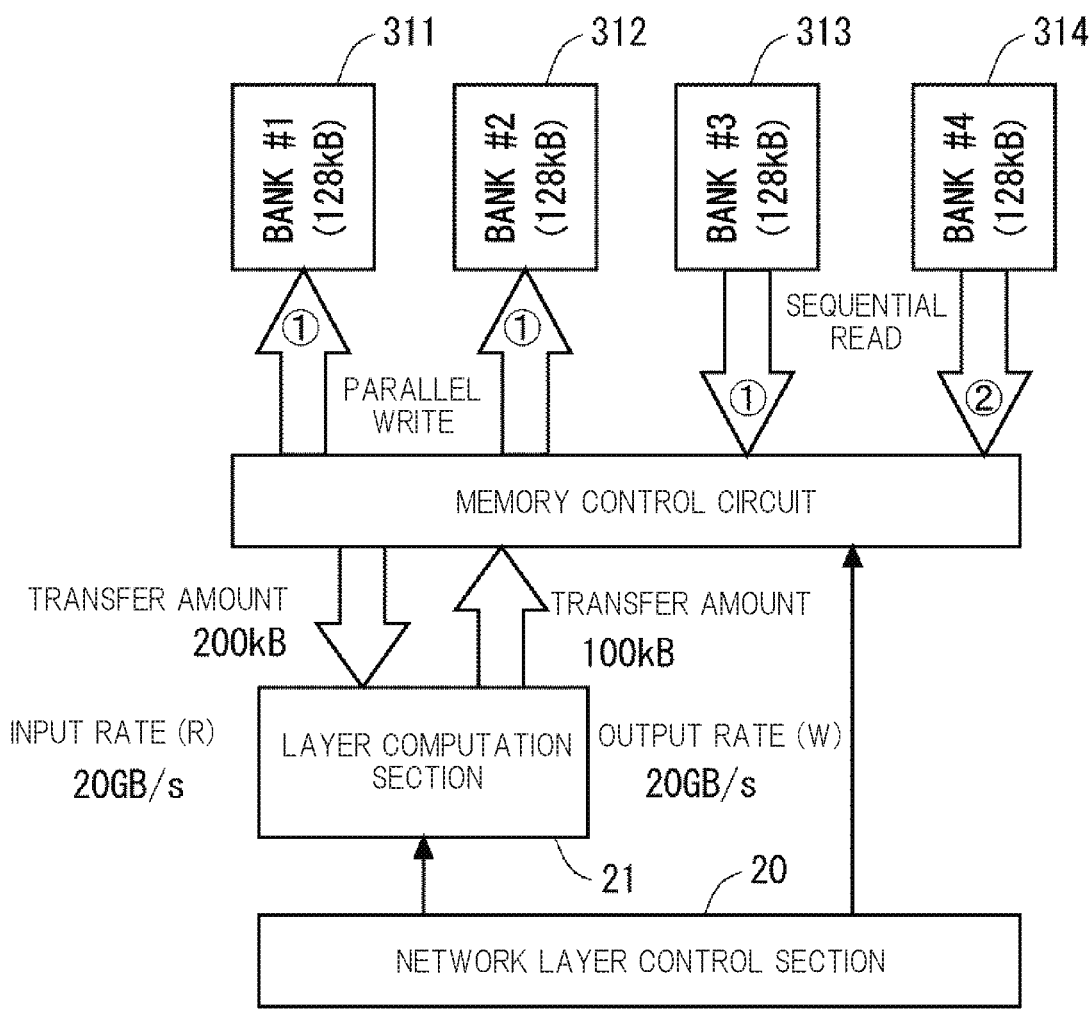
FIG. 14 is a diagram illustrating a data transfer state in a case where processing concerning a second layer of the semiconductor device according to the first embodiment is performed.

Next, FIG. 14 is a diagram illustrating the data transfer state in a case where processing concerning the second layer of the semiconductor device according to the first embodiment is performed. In the example of FIG. 14, the transfer amount of input data given to the layer computation section 21 is 200 kB, and the transfer rate of input data (input rate in FIG. 14) when it is read by the layer computation section 21 is 20 GB/s. Further, in the example of FIG. 14, the transfer amount of output data outputted from the layer computation section 21 is 100 kB, and the transfer rate of output data (output rate in FIG. 14) when it is written into a bank by the layer computation section 21 is 20 GB/s. In the example of the second layer depicted in FIG. 14, it is assumed according to the above transfer amounts of input/output data that two banks are assigned as the transfer sources of the input data, and that one bank is assigned as the transfer destination of the output data. Therefore, a data transfer state adequate for the processing of the second layer is obtained. However, in order to satisfy the transfer rate required for input of the third layer depicted in FIG. 15, it is necessary to parallelly access banks #1 and #2, which store the output data of the second layer. Accordingly, in the example of FIG. 14, parallel access is used after two banks are assigned as the transfer destinations of the output data. Sequential access is set as the method of accessing the banks to be assigned as the transfer destinations because the required transfer rate is smaller than the maximum bus bandwidth per bank. Based on the above-described settings, the layer computation section 21 in the accelerator section 11, which performs processing concerning the second layer, performs convolution product-sum operation processing.

The transfer amount and transfer rate of the output data depicted in FIG. 14 can be satisfied by accessing one bank. In such a case, data can be written in the second layer by sequentially accessing banks #1 and #2 in consideration of the order of data read operations performed when the third layer is parallelly accessed. A technical concept described in conjunction with the present embodiment does not exclude the above-described access method.

Figure 15:
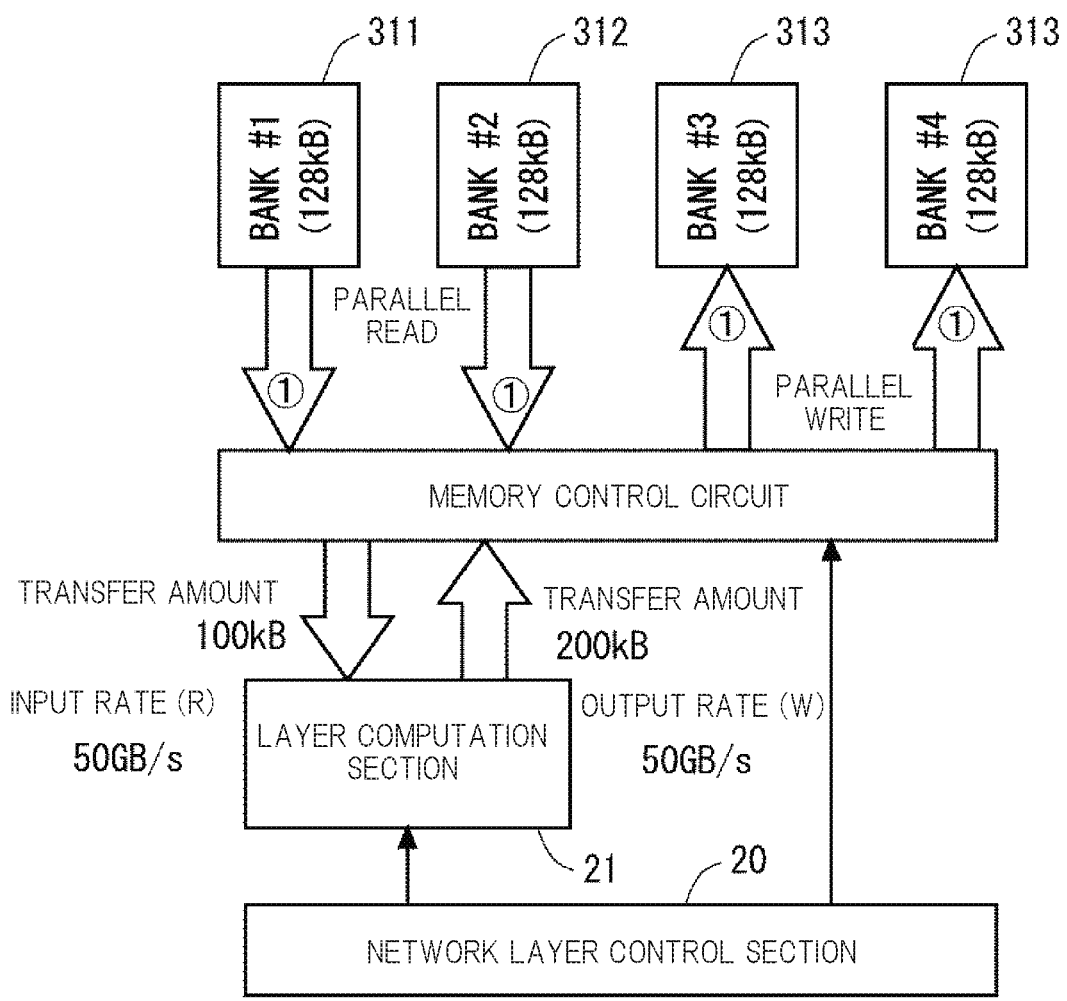
FIG. 15 is a diagram illustrating a data transfer state in a case where processing concerning a third layer of the semiconductor device according to the first embodiment is performed.

Next, FIG. 15 is a diagram illustrating the data transfer state in a case where processing concerning the third layer of the semiconductor device according to the first embodiment is performed. In the example of FIG. 15, the transfer amount of input data given to the layer computation section 21 is 100 kB, and the transfer rate of input data (input rate in FIG. 15) when it is read by the layer computation section 21 is 50 GB/s. Further, in the example of FIG. 15, the transfer amount of output data outputted from the layer computation section 21 is 200 kB, and the transfer rate of output data (output rate in FIG. 15) when it is written into a bank by the layer computation section 21 is 50 GB/s. In the example of the third layer depicted in FIG. 15, the above-mentioned transfer amount of input data can be satisfied by assigning one bank as the transfer source of input data. However, in consideration of the transfer rate of input data, it is necessary to assign two banks as transfer source banks. Further, two banks are assigned as the transfer destinations of the output data in order to satisfy the transfer amount and transfer rate of the output data. Meanwhile, parallel access is set as the method of accessing the banks to be assigned as the transfer sources and transfer destinations because the required transfer rate is greater than the maximum bus bandwidth per bank. Based on the above-described settings, the layer computation section 21 in the accelerator section 11, which performs processing concerning the third layer, performs convolution product-sum operation processing, activation processing, and pooling processing.

As described above, in the semiconductor device 1 according to the first embodiment, the number of banks to be used is changed based on the transfer amount and transfer rate of data for each intermediate layer of the convolution processing layer of the convolutional neural network. More specifically, for each intermediate layer, the semiconductor device 1 according to the first embodiment sets the number of banks capable of adequately storing the transfer amount of data. Further, for each intermediate layer, the semiconductor device 1 according to the first embodiment sets the number of assigned banks in such a manner as to satisfy the transfer rate of data. Moreover, for each intermediate layer, the semiconductor device 1 according to the first embodiment changes the banks to be assigned.

Consequently, in the semiconductor device 1 according to the first embodiment, an intermediate layer performing convolution processing is able to use a bank that is left unoccupied as it has been used by another intermediate layer. This makes it possible to effectively use a memory having a finite capacity. Further, the semiconductor device 1 according to the first embodiment is able to increase the number of parallelly accessible banks by changing the bank read/write status of each intermediate layer and changing the number of banks assigned as the transfer source and the transfer destination. This makes it possible to achieve a transfer rate greater than the maximum bus bandwidth per bank and obtain a transfer rate necessary for processing in an intermediate layer.

Consequently, the semiconductor device 1 according to the first embodiment is able to decrease the circuit area by reducing the capacities of built-in memories (e.g., memories 24, 25). Further, the semiconductor device 1 according to the first embodiment is able to reduce the power consumption by decreasing the maximum bus bandwidth per bank.

Meanwhile, the semiconductor device 1 according to the first embodiment is able to perform high-speed read/write processing operations by using SRAMs (Static Random Access Memories) as storage elements acting as the memories 24, 25. This enhances the computing capability of the semiconductor device 1.

Further, the semiconductor device 1 according to the first embodiment determines the number of banks assigned to each layer and the access method to be used for the assigned banks. In such a determination process (e.g., flowcharts of FIGS. 10 and 11), the bank assignment and access method are determined with a transfer destination bank assigned to store the output data of each layer in consideration of the input characteristics of a subsequent layer. In the example of FIG. 14, adequate performance can be obtained by sequentially accessing one bank with a view toward satisfying only the output characteristics of the second layer. However, in consideration of the input characteristics of the third layer disposed subsequently to the second layer, two banks are assigned as transfer destination banks for transferring the output data of the second layer, and the bank assignment is changed so as to parallelly access the two banks. When the bank assignment is made in consideration of not only the output characteristics of the current layer but also the input characteristics of the subsequent layer as described above, the input data can be read by using the maximum capability of the subsequent layer. Meanwhile, if the bank assignment is determined so as to satisfy the output characteristics of the current layer by taking the input characteristics of the subsequent layer into account, a disadvantage arises in that an excessive number of banks need to be assigned to the output characteristics of the current layer. However, if the number of assigned banks is within the limits of the hardware resources of the semiconductor device 1, only the rate of utilization of the hardware resources concerning the current layer increases, and thus an advantage arises in that the computing capability of the layer computation sections can be fully utilized for a plurality of layers.

Second Embodiment

The following description of a second embodiment of the present invention deals with an accelerator section 11a that is different from the accelerator section 11 according to the first embodiment. In the description of the second embodiment, elements identical with those described in conjunction with the first embodiment are designated by the same reference numerals as the corresponding elements in the first embodiment, and will not be redundantly described. Further, a semiconductor device including the accelerator section 11a according to the second embodiment is referred to as the semiconductor device 2.

Figure 16:
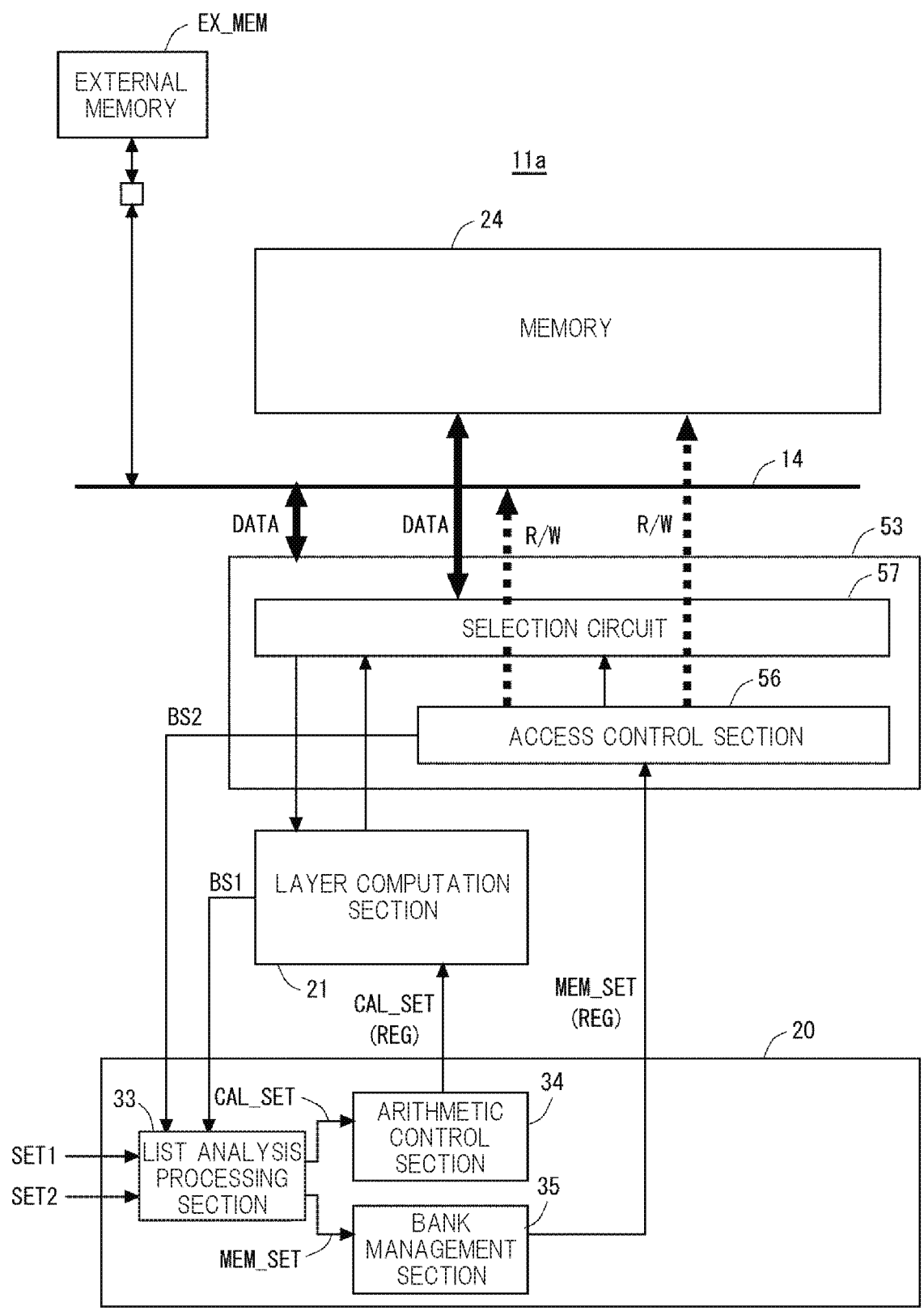
FIG. 16 is a block diagram illustrating configurations of the network layer control section and the memory control section that are included in the accelerator section according to a second embodiment of the present invention.

FIG. 16 is a block diagram illustrating configurations of the network layer control section and memory control section included in the accelerator section 11a according to the second embodiment. As illustrated in FIG. 16, the accelerator section 11a is obtained by replacing the memory control section 23 in the accelerator section 11 according to the first embodiment with a memory control circuit 53. The memory control circuit 53 includes an access control section 56 and a selection circuit 57.

Based on a command from the network layer control section 20, the memory control circuit 53 performs a save process or a refill process. The save process saves data stored in a bank into the external memory EX_MEM. The refill process refills a bank with the data stored in the external memory EX_MEM. The save process and the refill process are executed without regard to the execution of another process. The external memory EX_MEM includes a plurality of banks. Each bank of the external memory EX_MEM stores data concerning the save process and the refill process.

The access control section 56 is obtained by adding, to the access control section 36 depicted in FIG. 6, a function of giving a read/write command signal to the external memory EX_MEM through the local bus 14. The selection circuit 57 is obtained by adding, to the selection circuit 37 depicted in FIG. 6, a function of selecting a path for accessing the external memory EX_MEM through the local bus 14.

Figure 17:
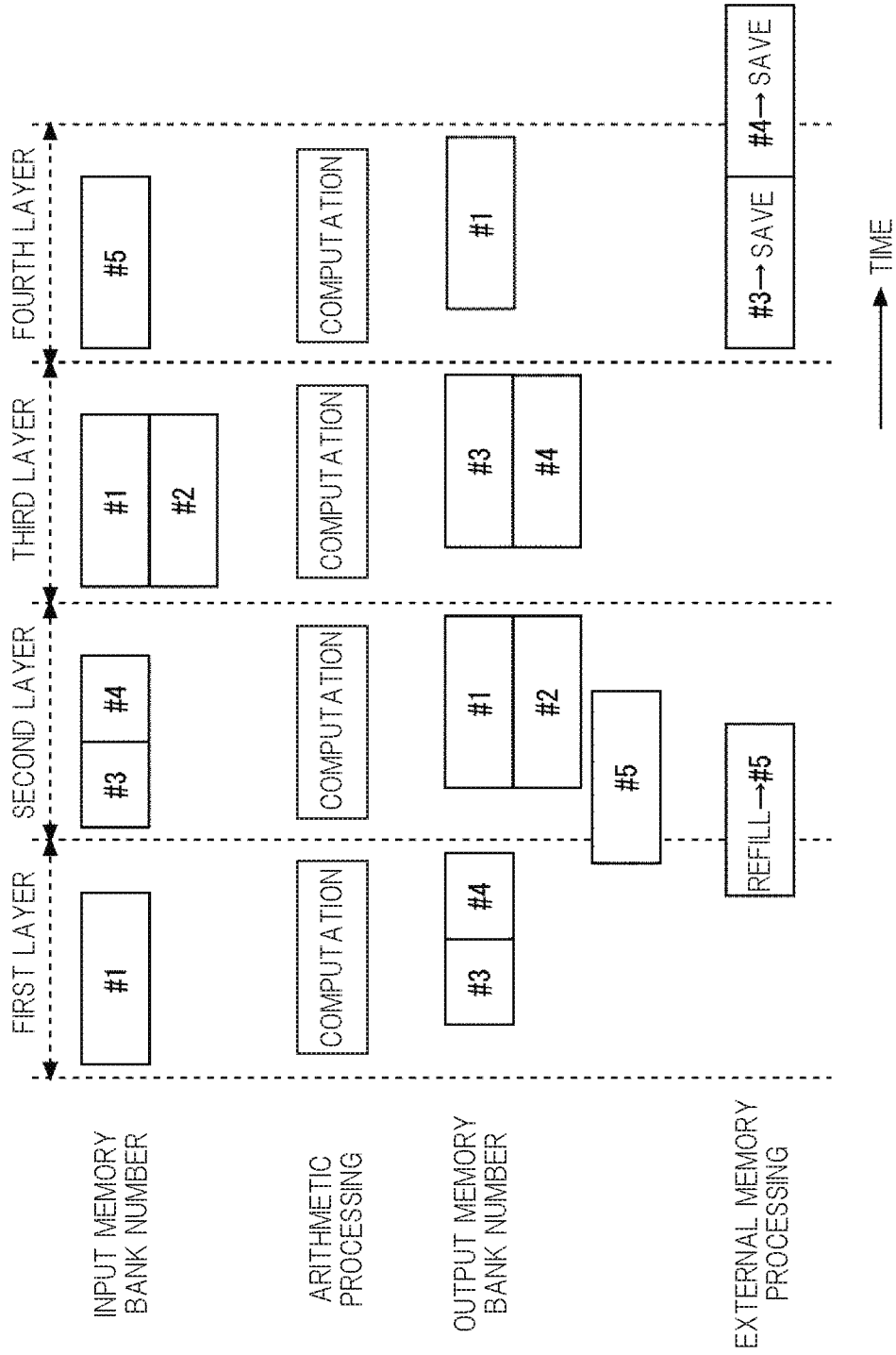
FIG. 17 is a timing diagram illustrating the operations of the semiconductor device according to the second embodiment.

Operations of the convolution processing layer in the semiconductor device 2 according to the second embodiment will now be described. FIG. 17 is a timing diagram illustrating the operations of the semiconductor device 2 according to the second embodiment. The example of FIG. 17 depicts exemplary operations of the semiconductor device 2 according to the second embodiment. Further, the example of FIG. 17 is obtained by adding the operations of a fourth layer, the refill process, and the save process to the operations of the semiconductor device 1 according to the first embodiment.

In the example of FIG. 17, during a period extended over a part of the period during which the first layer is subjected to convolution product-sum operation processing and over a part of the period during which the second layer is subjected to convolution product-sum operation processing, the semiconductor device 2 according to the second embodiment refills a bank with the input data to be used in the fourth layer. More specifically, the refill process is performed to refill bank #5 with data from the external memory EX_MEM. The data refilled into bank #5 then becomes the input data for the fourth layer. Further, in the example of FIG. 17, the save process is performed to save the data stored in banks #2 and #3 into the external memory EX_MEM by using the period during which the fourth layer is subjected to product-sum operation processing and the subsequent period. As illustrated in FIG. 17, the refill process and the save process are performed independently of processing in each layer.

Even if the save process is performed by an access method different from the access method used for data storage, no problem occurs. Further, in a case where data processed in one layer is stored in a plurality of banks, the save process and the refill process need to be performed on the data by using the banks as a single unit in order to prevent damage to the data.

Figure 18:
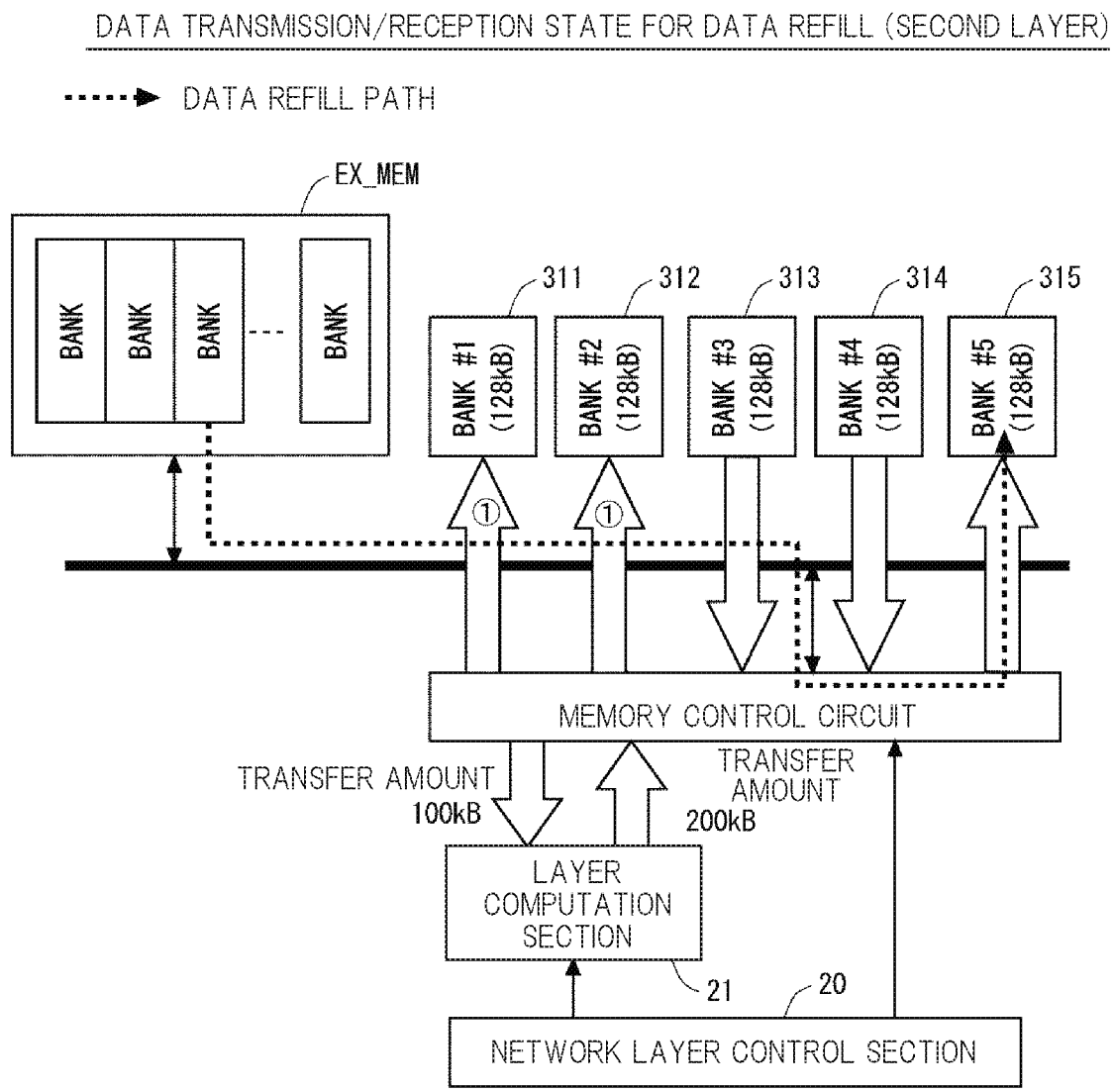
FIG. 18 is a diagram illustrating a data transfer path for data refill in the semiconductor device according to the second embodiment.

Data transfer paths for a data refill process and a data save process will now be described. FIG. 18 is a diagram illustrating a data transfer path for data refill in the semiconductor device according to the second embodiment. FIG. 18 illustrates a data transmission path for the data refill process that is performed during the processing in the second layer. In the example of FIG. 18, a path independent of convolution product-sum operation processing is formed for the data refill process. More specifically, data is transferred from a target bank of the external memory EX_MEM to bank #5.

Figure 19:
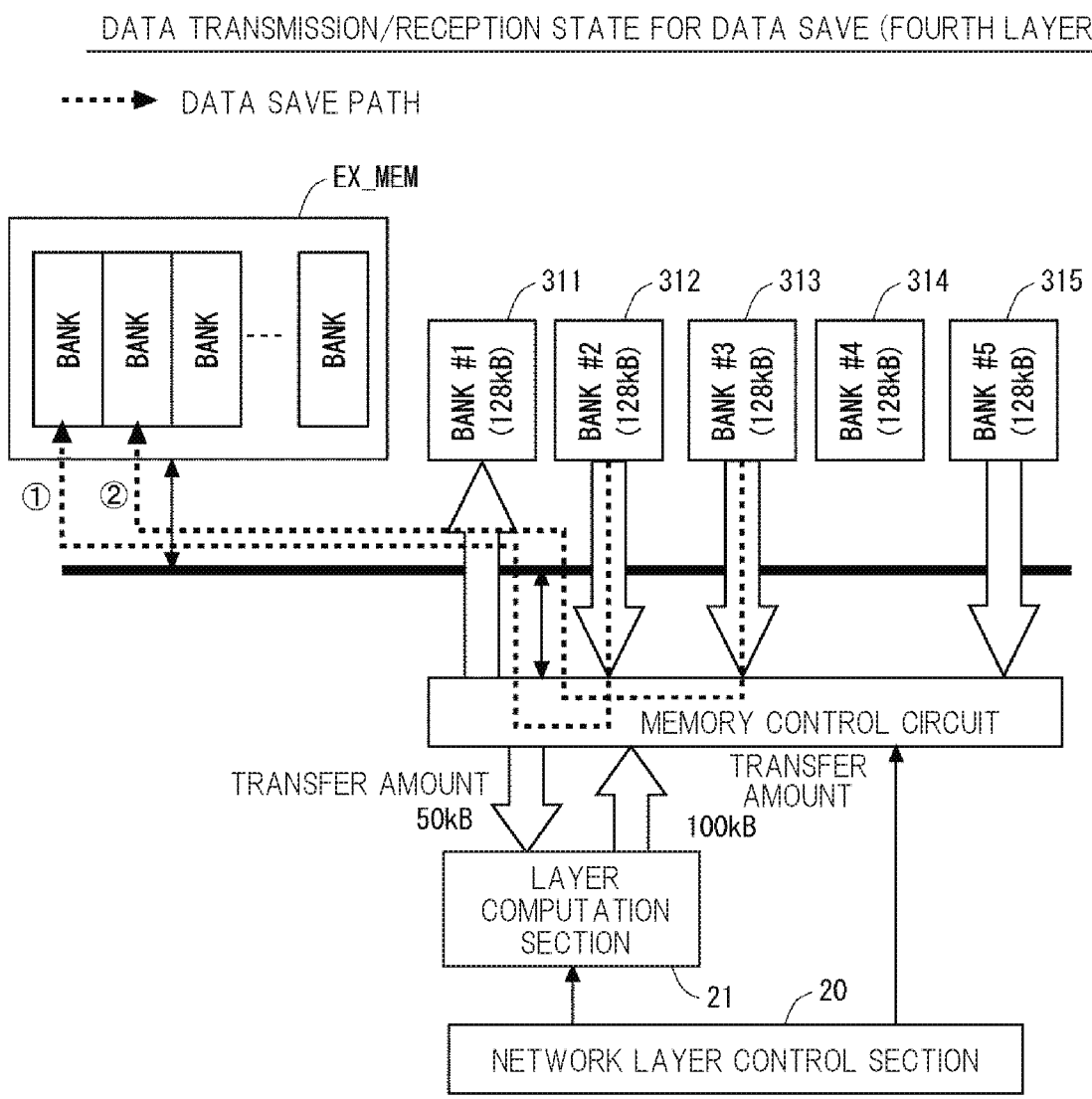
FIG. 19 is a diagram illustrating a data transfer path for data saving in the semiconductor device according to the second embodiment.

FIG. 19 is a diagram illustrating a data transfer path for data saving in the semiconductor device according to the second embodiment. FIG. 19 illustrates a data transmission path for the data save process that is performed during the processing in the fourth layer. In the example of FIG. 19, a path independent of convolution product-sum operation processing is formed for the data save process. More specifically, data is transferred from banks #2 and #3 to the target bank of the external memory EX_MEM. In this instance, the data save process is performed by sequentially accessing banks #2 and #3.

As is obvious from the above description, the semiconductor device 2 according to the second embodiment is configured so that the processes of refilling data and saving data into the memories in the accelerator section 11 can be performed independently of another process. Consequently, the semiconductor device 2 according to the second embodiment is capable of handling data larger in capacity than the memories in the accelerator section 11 without sacrificing the computing capability.

Figure 20:
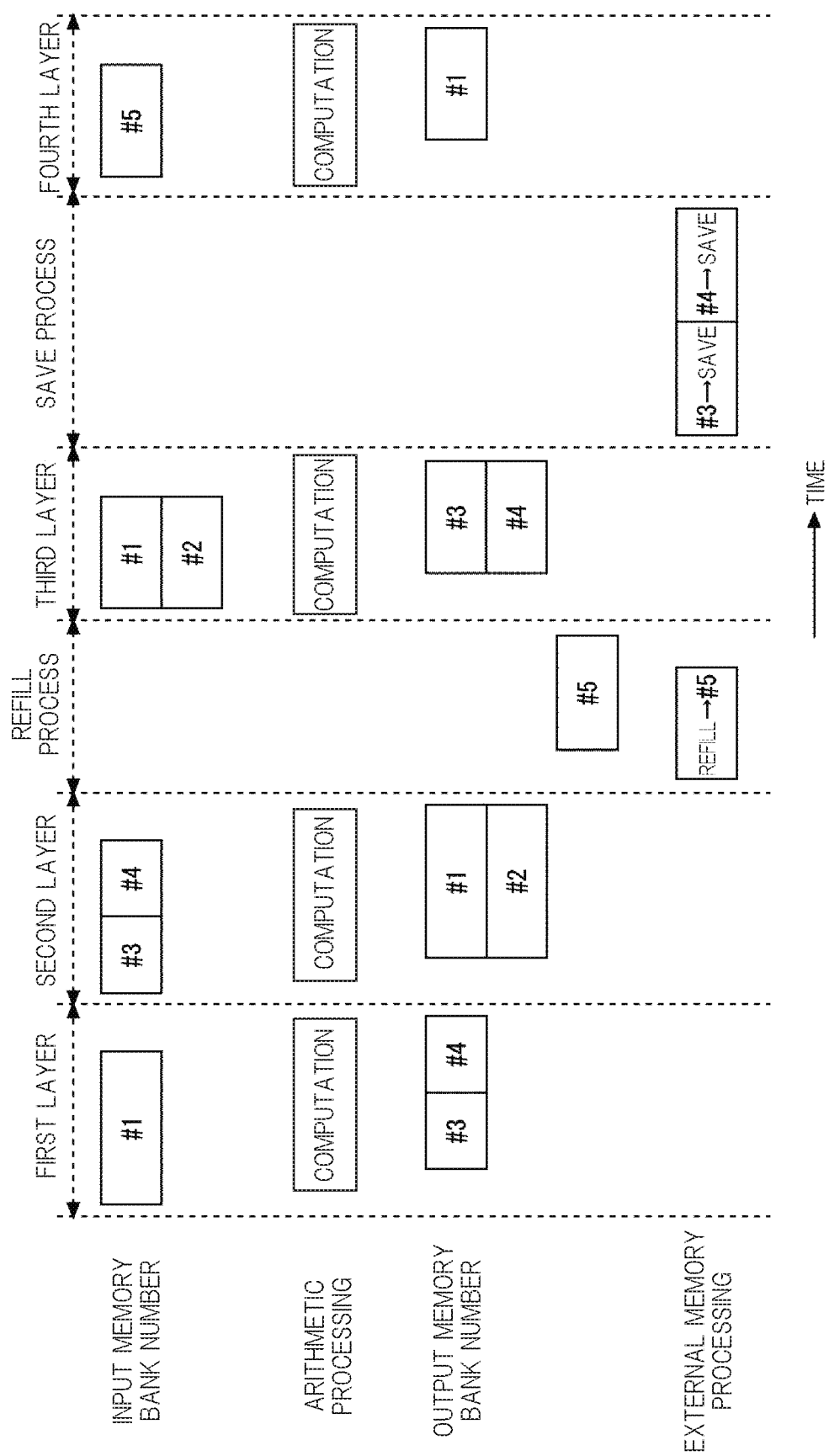
FIG. 20 is a timing diagram illustrating the operations of the semiconductor device according to a comparative example.

The effect of reducing computing time (or the effect of preventing the computing capability from being sacrificed) that is produced by the semiconductor device 2 according to the second embodiment will now be described with reference to FIG. 20. FIG. 20 is a timing diagram illustrating the operations of the semiconductor device according to a comparative example. The semiconductor device according to the comparative example performs all convolutional neural network processes by using only the main computing section 10 without using the accelerator section 11a according to the second embodiment.

As illustrated in FIG. 20, when performing the data refill process or the data save process, the semiconductor device according to the comparative example interrupts into the main computing section 10 in order to acquire access rights for performing the data refill process or the data save process. Therefore, the semiconductor device according to the comparative example is unable to execute the data refill process and the data save process in parallel with another process. Accordingly, the semiconductor device according to the comparative example needs to obtain a period for the data refill process and a period for the data save process in addition to a period for processing in an intermediate layer of the convolutional neural network. As a result, the time of processing in the semiconductor device according to the comparative example is increased by the periods required for the data refill and data save processes.

Meanwhile, the operations of the semiconductor device 2 according to the second embodiment, which are illustrated in FIG. 17, are such that the data refill process and the data save process are performed in parallel with the processing in an intermediate layer. Therefore, in the semiconductor device 2 according to the second embodiment, the data refill process and the data save process do not require any additional processing time. That is to say, the semiconductor device 2 according to the second embodiment is capable of handling data larger in capacity than the memories in the accelerator section 11 without sacrificing the computing capability.

Third Embodiment

The following description of a third embodiment of the present invention deals with a semiconductor device 3 that is different from the semiconductor device 1 according to the first embodiment. In the description of the third embodiment, elements identical with those described in conjunction with the first embodiment are designated by the same reference numerals as the corresponding elements in the first embodiment, and will not be redundantly described.

Figure 21:
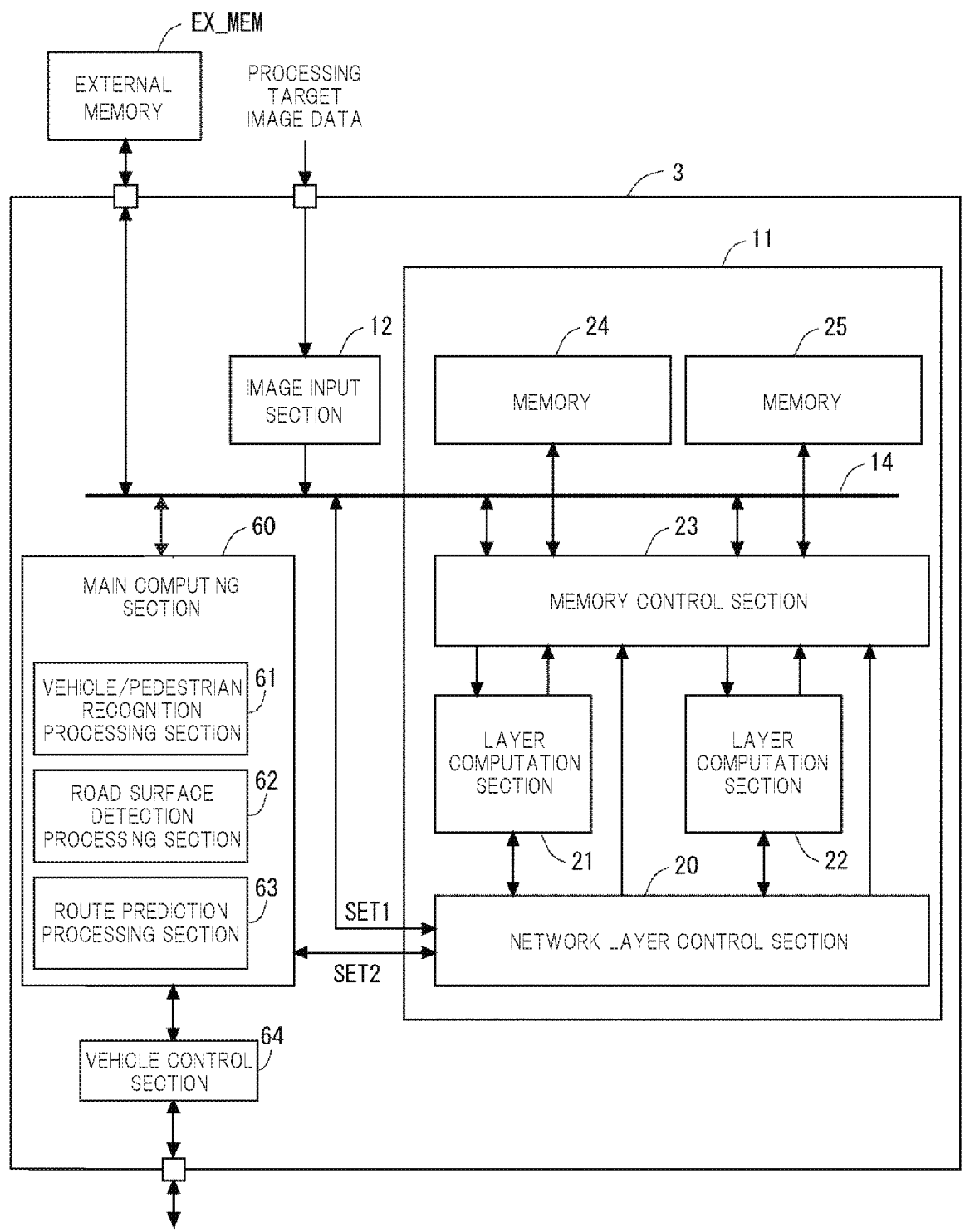
FIG. 21 is a block diagram illustrating the semiconductor device according to a third embodiment of the present invention.

FIG. 21 is a block diagram illustrating the semiconductor device 3 according to the third embodiment. As illustrated in FIG. 21, the semiconductor device 3 according to the third embodiment is obtained by replacing the main computing section 10 of the semiconductor device 1 with a main computing section 60 and adding a vehicle control section 64 to the semiconductor device 1. The main computing section 60 is obtained by adding a vehicle/pedestrian recognition processing section 61, a road surface detection processing section 62, and a route prediction processing section 63 to the main computing section 10.

The vehicle/pedestrian recognition processing section 61 is an object recognition section that recognizes road objects, including preceding vehicles, pedestrians, and road signs, in accordance with the result of computation performed on the fully connected layer by the main computing section 60. The road surface detection processing section 62 detects, as a road surface, a portion obtained by removing the road objects from an image in accordance with the result of computation performed on the fully connected layer by the main computing section 60. The route prediction processing section 63 predicts the travel route of a vehicle in accordance with the result of processing by the vehicle/pedestrian recognition processing section 61, the result of processing by the road surface detection processing section 62, and the speed and steering angle (not depicted) of the vehicle.

The vehicle control section 64 outputs control information, including information concerning the traveling, stop, and steering of the vehicle, in accordance with the result of processing performed by at least one of the vehicle/pedestrian recognition processing section 61, the road surface detection processing section 62, and the route prediction processing section 63. The control information is used, for example, to provide deceleration or stop control by illuminating a warning lamp and generating a warning sound for a driver of the vehicle or applying a brake in response to the detection of an approaching pedestrian, a red traffic light, or a road sign, provide throttle and brake control during the approach of a preceding vehicle, or provide steering angle control for collision avoidance and lane keeping. The control information is outputted from the vehicle control section 64 to an undepicted separate device through an in-vehicle network.

The semiconductor device 3 according to the third embodiment includes the vehicle/pedestrian recognition processing section 61, the road surface detection processing section 62, the route prediction processing section 63, and the vehicle control section 64, and is thus able to maintain safe traveling while recognizing obstacles for a host vehicle in accordance with information recognized by the convolutional neural network. Obstacles on a preceding travel route are detected in accordance with the result of processing by the route prediction processing section 63 and the vehicle/pedestrian recognition processing section 61. Consequently, the obstacles on the travel route of the host vehicle are recognized to achieve safe traveling.

The vehicle/pedestrian recognition processing section 61, the road surface detection processing section 62, the route prediction processing section 63, and the vehicle control section 64 need not always be built in the semiconductor device 3.

While the present invention made by its inventors has been described in detail in terms of particular embodiments, the present invention is not limited to the foregoing embodiments. It is obvious to those skilled in the art that various modifications can be made without departing from the spirit and scope of the present invention.

Supplementary Note 1

There is provided a semiconductor device including an accelerator section and a main computing section. The accelerator section performs a process concerning a convolution processing layer. The convolution processing layer performs convolution with a predetermined filter applied to an input image. The process concerning the convolution processing layer is one of the processes concerning the convolutional neural network. The main computing section performs a process concerning a fully connected layer that determines the input image in accordance with a result outputted from the accelerator section. The accelerator section includes a layer computation section, a memory, a memory control section, and a network layer control section. The layer computation section performs arithmetic processing including a convolution product-sum operation on elements of processing target image data of each of a plurality of intermediate layers included in the convolutional neural network. The memory stores input/output data of the layer computation section in the intermediate layers included in the convolutional neural network and includes a plurality of banks that are independently readable and writable. The memory control section not only switches each of the banks between a readable state and a writable state, but also performs routing of data transmission and reception between the layer computation section and the memory. The network layer control section controls, in accordance with the transfer amounts and transfer rates of input data and output data of the intermediate layers included in the convolutional neural network, the memory control section in such a manner as to change a read/write status assignment for the banks that store the input data or output data of the intermediate layers.

Supplementary Note 2

There is provided the semiconductor device as described in supplementary note 1. The main computing section includes at least one of an object recognition section, a road surface detection processing section, and a route prediction processing section. The object recognition section recognizes road objects, including preceding vehicles, pedestrians, and road signs, in accordance with the result of computation on the fully connected layer. The road surface detection processing section detects, as a road surface, a portion obtained by removing the road objects from an image in accordance with the result of computation on the fully connected layer. The route prediction processing section predicts the travel route of a vehicle in accordance with the result of processing by the object recognition section, the result of processing by the road surface detection processing section, and the speed and steering angle of the vehicle.

Supplementary Note 3

There is provided the semiconductor device as described in supplementary note 2. The semiconductor device includes a vehicle control section that outputs control information, including information concerning the traveling, stop, and steering of the vehicle, in accordance with the result of processing performed by at least one of the object recognition section, the road surface detection processing section, and the route prediction processing section.

What is claimed is:
1. A semiconductor device comprising:
   a layer computation section that performs arithmetic processing including a convolution product-sum operation on elements of processing target image data of each of a plurality of intermediate layers included in a convolutional neural network;
   a memory that stores input and output data of the layer computation section in the intermediate layers included in the convolutional neural network and includes a plurality of banks that is independently readable and writable;
   a memory control section that switches each of the banks between a readable state and a writable state and performs routing of data transmission and reception between the layer computation section and the memory; and
   a network layer control section that controls, in accordance with transfer amounts and transfer rates of input data and output data of the intermediate layers included in the convolutional neural network, the memory control section to change assignments of a read status and a write status for the banks that store the input data or output data of the intermediate layers,
   wherein, when a preceding intermediate layer among the successive intermediate layers is designated as a first intermediate layer and a subsequent intermediate layer is designated as a second intermediate layer, the network layer control section sets, in accordance with the transfer rate of the input data of the second intermediate layer and a bus transfer rate per bank of a bus coupling the memory control section to the banks, a number of banks for storing the output data of the first intermediate layer.

2. The semiconductor device according to claim 1, wherein, when the transfer amount of the output data to be outputted from the first intermediate layer is smaller than a capacity of one bank of the banks and the transfer rate of the input data to be inputted to the second intermediate layer is greater than the bus transfer rate, the network layer control section sets a number of banks for storing the output data of the first intermediate layer to 2 or more.

3. The semiconductor device according to claim 1, wherein the layer computation section includes:
  a convolution product-sum operation section that superimposes a filter having a predetermined image size on the processing target image data, shifts a position of the superimposed filter, calculates a product of pixel values of the processing target image data and pixel values of pixels included in the filter at each position of the superimposed filter, computes a total sum of the products concerning the pixels included in the filter, and generates a product-sum operation result image; and
  a pooling processing section that groups pixels in the product-sum operation result image into predetermined sizes, uses representative values of the grouped pixels as new pixel values, and generates a processed image formed of the new pixels values.

4. The semiconductor device according to claim 3, wherein the layer computation section includes an activation processing section that is disposed between the convolution product-sum operation section and the pooling processing section, and when the pixel values included in the product-sum operation result image do not satisfy predefined conditions, performs an activation process on the product-sum operation result image by applying a predetermined activation function to the pixel values included in the product-sum operation result image in order to replace the pixel values included in the product-sum operation result image with prescribed values.

5. The semiconductor device according to claim 3, wherein the layer computation section includes:
  a first selection section that selectively delivers input data to the convolution product-sum operation section; and
  a second selection section that selectively outputs, to the memory control section, output data outputted from the pooling processing section.

6. The semiconductor device according to claim 1, further comprising:
  an external memory that is disposed outside of the semiconductor device; and
  a local bus that controls data transmission and reception between the memory control section and the external memory,
  wherein, based on a command from the network layer control section, the memory control section executes a save process and a refill process without regard to the execution of a process concerning the intermediate layers, the save process saving data stored in the banks into the external memory, the refill process refilling the banks with data stored in the external memory.

7. The semiconductor device according to claim 6, wherein the external memory includes a plurality of memory banks, and stores data concerning the save process and the refill process in each of the memory banks.

8. The semiconductor device according to claim 1, further comprising:
  an accelerator section that performs a process concerning a convolution processing layer, the convolution processing layer performing convolution with a predetermined filter applied to an input image, the process concerning the convolution processing layer being one of the processes concerning the convolutional neural network; and
  a main computing section that performs a process concerning a fully connected layer, the fully connected layer determining the input image in accordance with a result outputted from the accelerator section,
  wherein the accelerator section includes the layer computation section, the memory, the memory control section, and the network layer control section.

9. A memory access setup method for a semiconductor device having a layer computation section, a memory, a memory control section, and a network layer control section, the layer computation section performing arithmetic processing including a convolution product-sum operation on elements of processing target image data of each of a plurality of intermediate layers included in a convolutional neural network, the memory storing input and output data of the layer computation section in the intermediate layers included in the convolutional neural network and including a plurality of banks that is independently readable and writable, the memory control section switching each of the banks between a readable state and a writable state and performing routing of data transmission and reception between the layer computation section and the memory, the network layer control section controlling, in accordance with transfer amounts and transfer rates of input data and output data of the intermediate layers included in the convolutional neural network, the memory control section in such a manner as to change assignments of a read status and a write status for the banks that store the input data or output data of the intermediate layers, the plurality of intermediate layers including a current intermediate layer, the memory access setup method comprising:
  setting a transfer source bank assignment indicative of the number of transfer source banks for storing the input data of the current intermediate layer to the same value as the number of transfer destination banks for storing the output data of a preceding intermediate layer preceding the current intermediate layer;
  setting a transfer source access method indicative of the method of accessing the transfer source banks of the current intermediate layer to the same method as a transfer destination access method used to read the output data of the preceding intermediate layer;
  setting a transfer destination bank assignment indicative of the number of transfer destination banks for storing the output data of the current intermediate layer in such a manner as to satisfy the transfer amount and transfer rate of the output data of the current intermediate layer as well as the transfer rate of the input data of a subsequent intermediate layer subsequent to the current intermediate layer; and
  setting a transfer destination access method indicative of the method of accessing the transfer destination banks of the current intermediate layer in such a manner as to satisfy the transfer rate of the output data of the current intermediate layer and the transfer rate of the input data of the subsequent intermediate layer, wherein the setting of the transfer destination bank assignment includes:
  calculating the number of banks capable of storing the output data of the current intermediate layer as the number of first assigned transfer destination banks;
  calculating, as the number of first transfer destination parallel accesses, an integer multiple by which the maximum bandwidth per bank is multiplied to determine a transferrable bandwidth that is smaller than the transfer rate of the output data of the current intermediate layer;
  updating the smaller of the number of first assigned transfer destination banks and the number of first transfer destination parallel accesses with the greater of the number of first assigned transfer destination banks and the number of first transfer destination parallel accesses;
  calculating, as the number of second transfer destination parallel accesses, an integer multiple by which the maximum bandwidth per bank is multiplied to determine a transferrable bandwidth that is smaller than the transfer rate of the input data of the subsequent intermediate layer;
  when the number of second transfer destination parallel accesses is smaller than the number of first transfer destination parallel accesses, setting the number of assigned transfer destination banks to a value not smaller than the number of second assigned banks; and
  when the number of second transfer destination parallel accesses is greater than the number of first transfer destination parallel accesses, setting the number of assigned transfer destination banks to the greater of the number of first assigned transfer destination banks and the number of second transfer destination parallel accesses, wherein the setting of the transfer destination access method includes:
  setting the transfer destination access method to parallel when at least either one of the number of the first transfer destination parallel accesses calculated by the calculating as the number of the first transfer destination parallel accesses and the number of the second transfer destination parallel accesses calculated by the calculating as the number of the second transfer destination parallel accesses is not smaller than 2; and
  setting the transfer destination access method to sequential when the number of the first transfer destination parallel accesses calculated by the calculating as the number of the first transfer destination parallel accesses and the number of the second transfer destination parallel accesses calculated by the calculating as the number of the second transfer destination parallel accesses are both 1.

10. The memory access setup method according to claim 9,
wherein, when the preceding intermediate layer does not exist, the setting the transfer source bank assignment includes:
  calculating the number of banks capable of storing the input data of the current intermediate layer as the number of first assigned transfer source banks;
  calculating, as the number of transfer source parallel accesses, an integer multiple by which the maximum bandwidth per bank is multiplied to determine a transferrable bandwidth that is smaller than the transfer rate of the input data of the current intermediate layer;
  when the number of transfer source parallel accesses is 1, setting the number of first assigned banks as the number of assigned transfer destination banks; and
  when the number of transfer source parallel accesses is not smaller than 1, setting, as the number of assigned transfer source banks, the number of second assigned transfer destination banks that is obtained by updating the number of first assigned transfer source banks to an integer multiple of the number of transfer source parallel accesses, and
wherein the setting the transfer source access method includes:
  setting the transfer source access method to parallel when the number of the transfer source parallel accesses calculated by the calculating as the number of the transfer source parallel accesses is not smaller than 2; and
  setting the transfer source access method to sequential when the number of the transfer source parallel accesses calculated by the calculating as the number of the transfer source parallel accesses is 1.

11. A semiconductor device comprising:
a layer computation section that performs arithmetic processing including a convolution product-sum operation on elements of processing target image data of each of a plurality of intermediate layers included in a convolutional neural network;
a memory that stores input and output data of the layer computation section in the intermediate layers included in the convolutional neural network and includes a plurality of banks that is independently readable and writable;
a memory control section that not only switches each of the banks between a readable state and a writable state, but also performs routing of data transmission and reception between the layer computation section and the memory; and
a network layer control section that controls, in accordance with the transfer amounts and transfer rates of input data and output data of the intermediate layers included in the convolutional neural network, the number of banks for storing the input data or output data of the intermediate layers to be parallelly accessed,
wherein, when a preceding intermediate layer among the successive intermediate layers is designated as a first intermediate layer and a subsequent intermediate layer is designated as a second intermediate layer, the network layer control section sets, in accordance with the transfer rate of the input data of the second intermediate layer and a bus transfer rate per bank of a bus coupling the memory control section to the banks, the number of banks for storing the output data of the first intermediate layer.

12. The semiconductor device according to claim 11, wherein, when the transfer amount of the output data to be outputted to the first intermediate layer is smaller than the capacity of the one bank and the transfer rate of the input data to be inputted to the second intermediate layer is greater than the bus transfer rate, the network layer control section sets the number of banks for storing the output data of the first intermediate layer to 2 or more.

* * * * *